(12) United States Patent  
Wu

(10) Patent No.: US 9,987,933 B2  
(45) Date of Patent: Jun. 5, 2018

(54) RANGE-EXTENDING, CHARGING, AND DRIVING APPARATUS FOR AN ELECTRIC VEHICLE

(71) Applicant: Chen-Yang Wu, Taipei (TW)

(72) Inventor: Chen-Yang Wu, Taipei (TW)

( * ) Notice: Subject to any disclaimer, the term of this patent is extended or adjusted under 35 U.S.C. 154(b) by 0 days. days.

(21) Appl. No.: 15/454,570

(22) Filed: Mar. 9, 2017

(65) Prior Publication Data

US 2017/0217322 A1   Aug. 3, 2017

Related U.S. Application Data

(63) Continuation-in-part of application No. 14/884,946, filed on Oct. 16, 2015, now Pat. No. 9,676,282.

(30) Foreign Application Priority Data

Mar. 10, 2015 (TW) .............................. 104203502 U  
Mar. 10, 2016 (CN) ..................... 2016 2 0183984 U

(51) Int. Cl.
  *B60L 11/18*  (2006.01)
  *B60K 17/04*  (2006.01)
  *H02K 7/116* (2006.01)

(52) U.S. Cl.
  CPC ........ *B60L 11/1809* (2013.01); *B60K 17/046* (2013.01); *B60L 11/1851* (2013.01); *B60L 11/1887* (2013.01); *H02K 7/116* (2013.01)

(58) Field of Classification Search
  CPC ............ B60L 11/1809; B60L 11/1887; B60K 17/043; B60K 17/046; B60K 17/14; B60K 17/145; B60K 7/00; B60K 7/0007; B60K 7/0038; B60K 7/0061; B60K 7/009  
  See application file for complete search history.

(56) References Cited

U.S. PATENT DOCUMENTS

| | | | | |
|---|---|---|---|---|
| 3,812,928 A | * | 5/1974 | Rockwell ............. | B60K 7/0007 105/55 |
| 3,865,207 A | * | 2/1975 | Schwab ................. | B60K 17/14 180/21 |
| 2007/0114082 A1 | * | 5/2007 | Nozaki ..................... | B60K 6/48 180/65.6 |

(Continued)

FOREIGN PATENT DOCUMENTS

CN   102673380   9/2012  
CN   202518082   11/2012

(Continued)

OTHER PUBLICATIONS

China Patent Office, Office Action, Patent Application Serial No. 201610136412.7, dated Oct. 24, 2017.

(Continued)

*Primary Examiner* — Erez Gurari

(57) ABSTRACT

A range-extending, charging, and driving apparatus for an electric vehicle includes a wheel motor and a damping component. The wheel motor is connected to a wheel set of the electric vehicle for driving the wheel set. The wheel motor is further connected to a main battery for charging the main battery when the wheel motor generates electric power reversely. The damping component is connected between the wheel set and the wheel motor for absorbing shocks of the wheel motor or the wheel set.

24 Claims, 19 Drawing Sheets

(56) References Cited

U.S. PATENT DOCUMENTS

| | | | |
|---|---|---|---|
| 2007/0181357 A1* | 8/2007 | Saito | B60K 7/0007 180/65.51 |
| 2008/0053719 A1* | 3/2008 | Yoshino | B60K 7/0007 180/55 |
| 2009/0093931 A1 | 4/2009 | Mizutani et al. | |
| 2009/0156318 A1* | 6/2009 | Tashiro | B60K 7/0007 464/103 |
| 2009/0273249 A1* | 11/2009 | Lamperth | B60K 7/0007 310/77 |
| 2012/0059538 A1* | 3/2012 | Morris | B60W 10/08 701/22 |
| 2013/0009449 A1* | 1/2013 | Ishizuka | B60K 17/043 301/6.5 |
| 2013/0218388 A1 | 8/2013 | Katsuyama et al. | |
| 2016/0214474 A1* | 7/2016 | Igi | F16D 55/226 |
| 2016/0355084 A1* | 12/2016 | Uozumi | H02K 1/30 |
| 2016/0375930 A1* | 12/2016 | Arima | B62D 3/14 180/441 |
| 2017/0058975 A1* | 3/2017 | Szewczyk | F16D 55/225 |
| 2017/0217322 A1* | 8/2017 | Wu | B60L 11/1809 |
| 2017/0253144 A1* | 9/2017 | Arima | B60K 7/0007 |
| 2017/0257004 A1* | 9/2017 | Huang | B62M 6/65 |

FOREIGN PATENT DOCUMENTS

| | | |
|---|---|---|
| CN | 102878218 | 1/2013 |
| CN | 104228549 | 12/2014 |
| CN | 204845516 | 12/2015 |
| CN | 205395804 | 7/2016 |
| DE | 102009038416 | 2/2011 |
| FR | 3022858 | 1/2016 |
| WO | 2004030969 | 4/2004 |

OTHER PUBLICATIONS

European Patent Office, Search Seport, Aplication No. 17160334. 3-1927, dated Nov. 21, 2017.

* cited by examiner

RANGE-EXTENDING, CHARGING, AND DRIVING APPARATUS FOR AN ELECTRIC VEHICLE

CROSS-REFERENCES TO RELATED APPLICATIONS

This application is a continuation-in-part (CIP) of application Ser. No. 14/884,946, filed on Oct. 16, 2015 with claiming foreign priority of TW104203502.

This application claims additional priority under 35 U.S.C. § 119(a) on Patent Application No. 201620183984.6 filed in China, P.R.C. on Mar. 10, 2016. The prior applications are herewith incorporated by reference in its entirety.

BACKGROUND

Technical Field

The instant disclosure relates to a driving device for an electric vehicle, and particularly relating to a range-extending, charging, and driving apparatus for an electric vehicle, wherein the apparatus is capable of extending the cruising range, enhancing the torque, speed of the electric vehicle, providing fuel (oxygen), or supplying the fuel to fuel cell which charges the main battery of the electric vehicle, and the electric vehicle can be, for example: a pure battery-powered electric vehicle, hybrid electric vehicle (HEY), a fuel cell electric vehicle (FCEV), hybrid battery and fuel-cell electric vehicle, range-extended electric vehicle such as a range-extended electric vehicle with an internal combustion engine and a generator, fuel-cell range-extended electric vehicle, and electric motorcycle.

Related Art

Electric vehicles gain much more attention as the problem of environmental pollution caused by traditional fuel vehicles and the rising of the fuel oil price are concerned. Reduced environmental pollution would be caused by the electric vehicles, which are driven by drive motors and employ batteries as power sources, without the restriction of using engines.

However, the problems of the pure electric vehicles in general have deterred the consumers. One problem is that the user has to wait for a period time for the charging of the battery of the electric vehicle when the electric vehicle must stop working due to the battery running out of energy. Another problem is that the user has to look for a nearest one from the charging stations, which are not as widely distributed as the gas stations. Thus, it is desirable for the industry to extend operation time of electric power, to enhance performance of torque and acceleration of the electric vehicles under normal operation.

Moreover, when the wheels of the vehicle suffer shocks, the coil sensing of the motor is affected, thereby further affecting the performance of magnetic fields due to currents and the performance of electromagnetic induction.

SUMMARY

In one embodiment, a range-extending, charging, and driving apparatus for an electric vehicle comprising a wheel set comprises a wheel motor and a damping component. The wheel motor is connected to the wheel set of the electric vehicle for driving the wheel set. The wheel motor is further connected to a main battery for charging the main battery when the wheel motor generates electric power reversely. The damping component is connected between the wheel set and the wheel motor for absorbing shocks of the wheel motor or the wheel set.

In one embodiment, a range-extending, charging, and driving apparatus for an electric vehicle comprises a planetary gear assembly and a wheel motor. The planetary gear assembly comprises at least one planetary gear, a planet carrier unit, a ring gear, and a sun gear unit. The wheel motor is connected to the corresponding planetary gear assembly for driving the planetary gear assembly and a wheel set, connected to the planetary gear assembly, of a plurality of wheels of the electric vehicle. The wheel motor is further connected to a main battery for charging the main battery when the wheel motor generates electric power reversely. When the wheel motor is connected to and drives the planetary gear assembly, the wheel motor does work on the planetary gear assembly, and the planetary gear assembly drives the wheel set to turn. When the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery. The apparatus further comprises a fuel cell coupled to the main battery and utilized for charging the main battery. The fuel cell can charge the main battery and/or serve as an electric power source.

Based on the above, various configurations are indicated in the following.

1. When a wheel motor drives a planetary gear assembly, the wheel motor does work on the planetary gear assembly, and the planetary gear assembly then drives the wheel(s) to turn, one of the following 6 configurations can be then selected. (1) To obtain a torque increase, a large speed reduction in same direction is achieved at the rear wheel(s) by that the ring gear is held, the sun gear is as an input, and the planet carrier is as an output, during the front wheel(s) idling for generation of electric power. (2) To enhance speed of the electric vehicle, a large speed increase in same direction is achieved at the front wheel(s) by that the ring gear is held, the sun gear is as an output, and the planet carrier is as an input, during the rear wheel(s) idling for generation of electric power. In addition, one of the following can be selected. (3) To enhance speed of the electric vehicle, a large speed increase in same direction is achieved at the rear wheel(s) by that the ring gear is held, the sun gear is as an output, and the planet carrier is as an input, during the front wheel(s) idling for generation of electric power. (4) To obtain a torque increase, a large speed reduction in same direction is achieved at the front wheel(s) by that the ring gear is held, the sun gear is as an input, and the planet carrier is as an output, during the rear wheel(s) idling for generation of electric power. (5) To obtain a torque increase, a large speed reduction in same direction is achieved at the rear wheel(s) and the front wheel(s) by that the ring gear is held, the sun gear is as an input, and the planet carrier is as an output. (6) To enhance speed of the electric vehicle, a large speed increase in same direction is achieved at the front wheel(s) and the rear wheel(s) by that the ring gear is held, the sun gear is as an output, and the planet carrier is as an input.

2. When the wheel motor does not drive planetary gear assembly, the idle wheel drives the planetary gear assembly, the planetary gear assembly drives the wheel motor in reverse for generation of electric power, and the planetary gear assembly can then operate in one of the configurations:

(1) during the front wheel(s) idling for generation of electric power, a large speed reduction in same direction is achieved at the planetary gear assembly for the front wheel(s) by that the ring gear is held, the sun gear is as an input, and the planet carrier is as an output; or (2) during the rear wheel(s) idling for generation of electric power, a large speed increase in same direction is achieved at the planetary gear assembly for the rear wheel(s) by that the ring gear is held, the sun gear is as an output, and the planet carrier is as an input. In addition, the planetary gear assembly can operate in one of the configurations: (3) during the front wheel(s) idling for generation of electric power, a large speed increase in same direction is achieved at the planetary gear assembly for the front wheel(s) by that the ring gear is held, the sun gear is as an output, and the planet carrier is as an input; or (4) during the rear wheel(s) idling for generation of electric power, a large speed reduction in same direction is achieved at the planetary gear assembly for the rear wheel(s) by that the ring gear is held, the sun gear is as an input, and the planet carrier is as an output.

3. An outer shaft of a wheel motor: when the planetary gear is driven to do work, or when the planetary gear is driven for generation of electric power, an inner shaft of the wheel motor is connected to and drives the air compressor to compress air, so that the compressed air (with oxygen), used as fuel, can be supplied to the fuel cell, which can serve as an electric power source and/or can charge the main battery.

4. The impacts of the wheel chattering in, e.g., up-and-down movement or back-and-forth movement on the wheel motor or the impacts on the wheel motor caused by the axial dragging of the external force can be effectively reduced by assembling the damping component, the universal joint, the spline shaft, and the shaft liner between the planetary gear assembly and the wheel.

BRIEF DESCRIPTION OF THE DRAWINGS

The disclosure will become more fully understood from the detailed description given herein below for illustration only, and thus not limitative of the disclosure, wherein.

DETAILED DESCRIPTION

According to the instant disclosure, a range-extending, charging, and driving apparatus is provided for use in an electric vehicle or an electric motorcycle. As will be illustrated in various embodiments, the range-extending, charging, and driving apparatus can be employed to extend the cruising range of and charging an electric vehicle, or can be employed to extend the cruising range, to enhance the torque, speed, or to extend the operation time of electric power of an electric vehicle. The range-extending, charging, and driving apparatus can be utilized in a variety of electric vehicles, for examples, electric vehicles with a driving energy source using a main battery and a fuel cell, such as electric cars, electric trucks, electric motorcycles, electric bicycles, and so on. Further, the instant disclosure is not limited thereto, and the electric vehicles for the instant disclosure can cover different kinds of electric vehicles: pure battery-powered electric vehicles, hybrid electric vehicles (HEV), fuel cell electric vehicles (FCEV), hybrid battery and fuel-cell electric vehicles, range-extended electric vehicles such as range-extending electric vehicles with an internal combustion engine and a generator, fuel-cell range-extending electric vehicles, and electric motorcycles. The main battery, for example, is a lithium battery, or NiMH battery; the fuel cell, for example, the use of oxygen as a fuel of the fuel cell, or lithium, vanadium, zinc and other metal fuel cells, or methanol, a direct methanol fuel cell. However, the instant disclosure is not limited thereto.

Figure 1A:
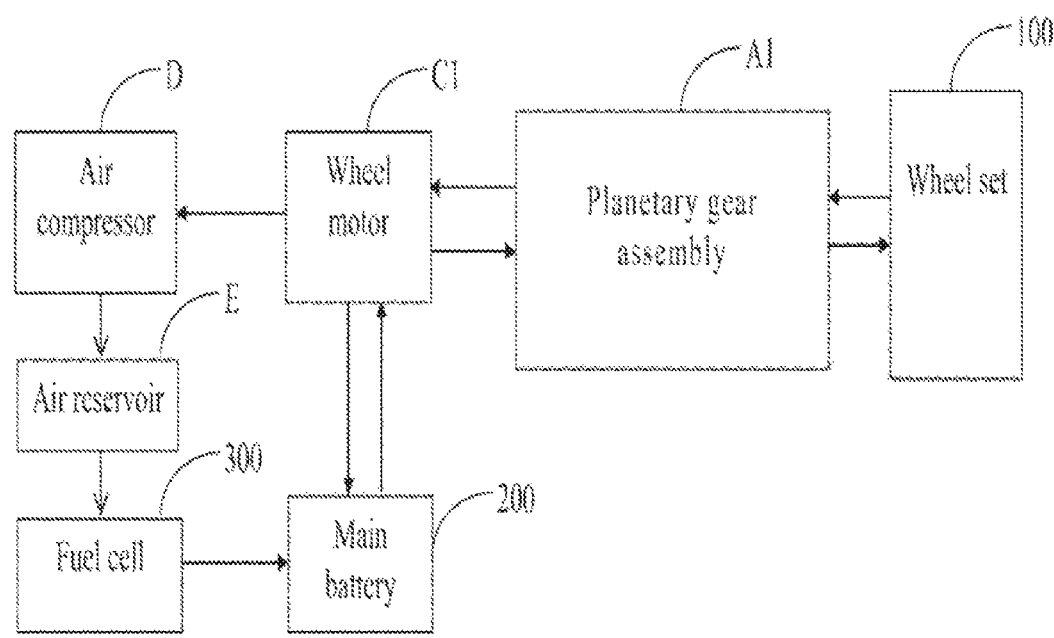
FIG. 1A illustrates a block diagram of a range-extending, charging, and driving apparatus for an electric vehicle, according to a first embodiment of the instant disclosure.

According to a first embodiment of the instant disclosure, a range-extending, charging, and driving apparatus is provided for use in an electric vehicle. As shown in FIG. 1A, the apparatus comprises: a planetary gear assembly A1 and a wheel motor C1. The wheel motor C1, connected to the planetary gear assembly A1 corresponding to the wheel motor C1, is employed for driving the planetary gear assembly A1 and a wheel set 100 (which is connected to the planetary gear assembly A1) of wheels of the electric vehicle. The wheel motor C1 is further connected to a main battery 200 of the electric vehicle, and employed for charging the main battery 200 when the wheel motor C1 in reverse generates electric power. When the wheel motor C1 is connected to and drives the planetary gear assembly A1, the wheel motor C1 does work on the planetary gear assembly A1, and the planetary gear assembly A1 drives the wheel set 100 to turn; when the wheel motor C1 is connected to but does not drive the planetary gear assembly A1, the wheel set 100, which idles, reversely drives the planetary gear assembly A1, and the planetary gear assembly A1 reversely drives the wheel motor C1 to reversely generate electric power so as to charge the main battery 200.

In a second embodiment of the instant disclosure, the range-extending, charging, and driving apparatus for an electric vehicle further comprises: an air compressor D and an air reservoir E, as illustrated in FIG. 1A. The air compressor D is connected to the wheel motor C1, when the wheel motor C1 does work or reversely generates electric power so as to charge the main battery 200, the air compressor D is driven by the wheel motor C1 to compress air and the compressed air, utilized as fuel, is provided to a fuel cell, wherein the fuel cell is electrically coupled to the main battery 200, and employed for charging the main battery 200. The fuel cell can charge the main battery and/or serve as an electric power source. The air reservoir E is fluidly coupled or connected to the air compressor D, for storing the air compressed by the air compressor D.

The above-mentioned wheel set 100 represents at least one wheel of an electric vehicle. For instance, the wheel set 100 can be at least one front wheel of the electric vehicle, or the wheel set 100 can be at least one rear wheel of the electric vehicle. The two embodiments of the range-extending, charging, and driving apparatus can be implemented as electric vehicles such as electric motorcycles or bicycles, equipped with two wheels, three wheels, or more wheels. For examples, one of the above two embodiments of the range-extending, charging, and driving apparatus is implemented in a rear wheel set (or front wheel set) of an electric motorcycle or bicycle.

In addition, the two embodiments of the range-extending, charging, and driving apparatus can be utilized in electric vehicles equipped with three or more wheels, such as electric cars or trucks. In an example, each of four wheels (regarded as four different wheel sets 100) of an electric vehicle is equipped with one of the above two embodiments of the range-extending, charging, and driving apparatus. Similarly, electric cars with six or eight wheels, for example, can be also configured using one of the two embodiments as above. Further, for instance, in an implementation of an electric vehicle, the range-extending, charging, and driving apparatus can be configured for a plurality of left rear wheels that are regarded as a wheel set, and for a plurality of right rear wheels that are regarded as another wheel set. By referring to above examples of configuration of the apparatus, the apparatus can be also configured to be employed in another implementation with a plurality of left front wheels and a plurality of right front wheels. As for the wheel motor(s), for example, the wheel motors can be, or implemented by using, axial-flux motors, axial-flux permanent magnet motors, permanent magnet reluctance motors, brushless DC motors, radial-type brushless DC motors, disc-type brushless DC motors, disc-type axial-flux brushless DC motors, or slotless axial-flux permanent magnet motors; but the disclosure is not limited thereto, any other suitable motors can be utilized for implementation according to the instant disclosure.

In addition, an electric vehicle can be configured to extend the cruising range, to enhance the torque, speed of the electric vehicle, and to charge the main battery when wheels of the electric vehicle idle so as to achieve cruising range extension, by utilizing various configurations of the wheel motor(s) and planetary gear assembly(ies) with the wheel set(s) in the range-extending, charging, and driving apparatus, as illustrated in one of the two embodiments. For illustration purpose, some embodiments are provided as follows.

Figure 1B:
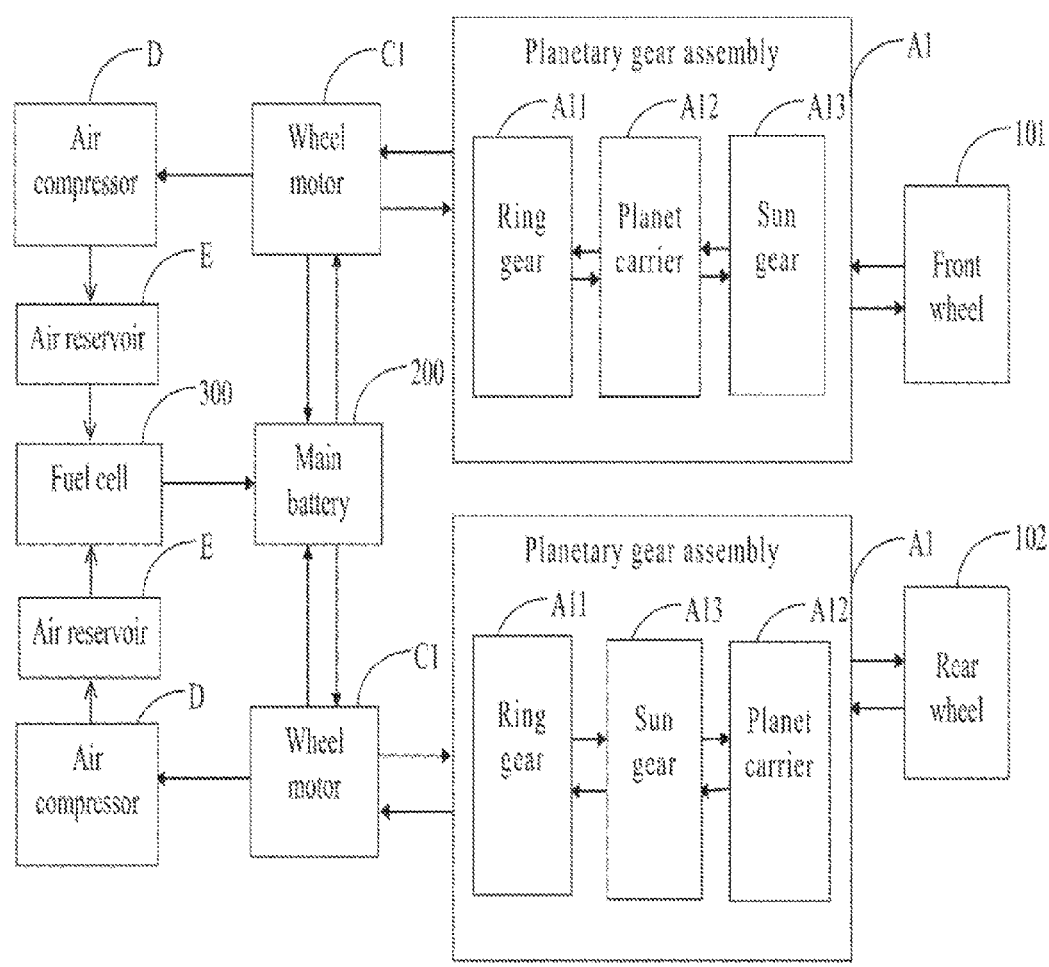
FIG. 1B illustrates a detailed block diagram of the range-extending, charging, and driving apparatus for an electric vehicle, according to the first embodiment of the instant disclosure.
Figure 2:
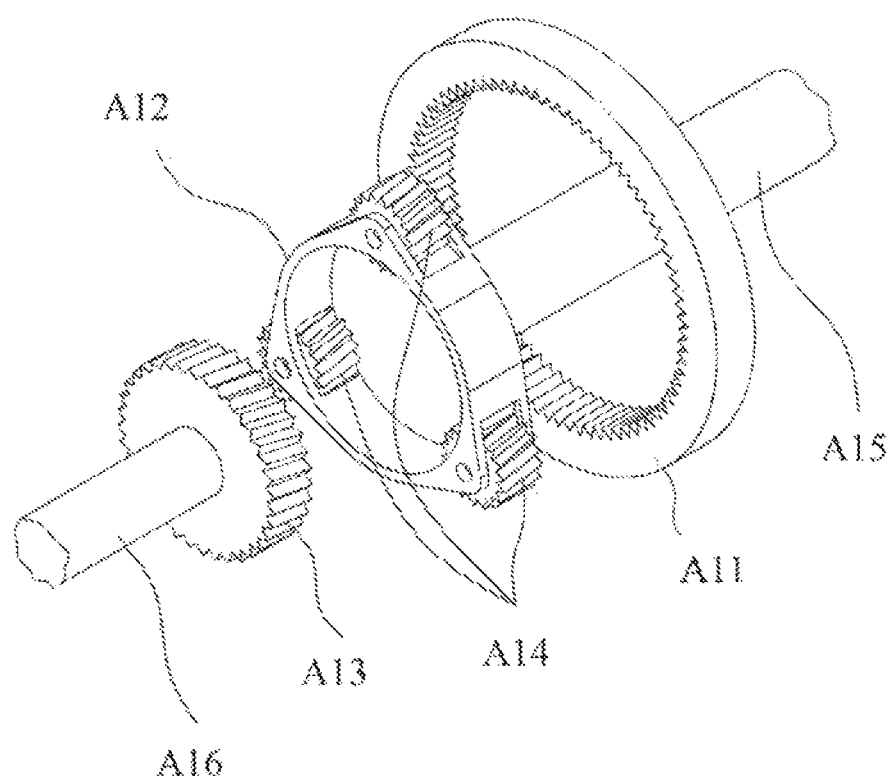
FIG. 2 illustrates a schematic diagram of the range-extending, charging, and driving apparatus for an electric vehicle, according to the first embodiment of the instant disclosure.

Referring to both FIGS. 1B and 2, a range-extending, charging, and driving apparatus for an electric vehicle is illustrated in a block diagram form. In this embodiment, the range-extending, charging, and driving apparatus for an electric vehicle comprises a planetary gear assembly A1, a wheel motor C1, a fuel cell 300, and an air compressor D. For instance, two or more wheels of the electric vehicle, such as a front wheel 101, a rear wheel 102, can be connected to their corresponding planetary gear assemblies A1. The planetary gear assembly A1 is connected to the wheel motor C1. The wheel motor C1 is connected to the air compressor D and the main battery 200. The air compressor D can provide compressed air as fuel for the fuel cell 300 by the operation in the range-extending, charging, and driving apparatus. In addition, the fuel cell 300 can be employed to charge the main battery 200. In this embodiment, the electric vehicle utilizes the main battery 200 and fuel cell 300 to supply electric power for driving the wheels.

As illustrated in FIG. 2, the planetary gear assembly A1 includes a planetary gear A14, a planet carrier unit, a ring gear A11, and a sun gear unit. For example, the planet carrier unit includes at least a planet carrier A2 and a planet carrier shaft A15; the sun gear unit includes a sun gear A13 and a sun gear shaft A16. The planet carrier A12 of the planetary gear assembly A1 carries the planet carrier shaft A15. The planetary gear A14 of the planetary gear assembly A1 is disposed around within the ring gear A11, supported and positioned by the planet carrier A12. The sun gear shaft A16 is disposed one side of the sun gear A13, and the sun gear A13 is disposed inside the planetary gear A14, such that the sun gear A13 and the planetary gear A14 can mutually interact. In addition, at least one wheel (i.e., a wheel set) and a wheel motor C1 can be configured with one or more of planetary gear assemblies A1.

The wheel motor C1 is connected to the planetary gear assembly A1 to further drive the wheel(s). When the wheel motor C1 drives the planetary gear assembly A1, the wheel motor C1 does work on the planetary gear assembly A1, and the planetary gear assembly A1 then drives the wheel(s) to turn, one of the configurations as indicated below can be selected: (1) when the wheel motor C1 is connected to and drives the sun gear shaft A16, the sun gear A13 is then connected to and drives the planet carrier A12, and the planet carrier shaft A15 is then connected to and drives the rear wheel 102, the sun gear A13 is as an input, the planet carrier A12 is as an output, and the ring gear A11 is held, providing a large speed reduction in same direction at the rear wheel to result in a torque increase at the rear wheel; (2) when the wheel motor C1 is connected to and drives the planet carrier shaft A15, the planet carrier A12 is then connected to and drives the sun gear A13, and the sun gear shaft A16 is then connected to and drives the front wheel 101, the planet carrier A12 is as an input, the sun gear A13 is as an output, and the ring gear A11 is held, providing a large speed increase in same direction at the front wheel, enhancing speed of the electric vehicle. In addition, (3) When the wheel motor C1 is connected to and drives the planet carrier shaft A15, the planet carrier A12 is then connected to and drives the sun gear A13, and the sun gear shaft A16 is then connected to and drives the rear wheel 102, the planet carrier A12 is as an input, the sun gear A13 is as an output, and the ring gear A11 is held, providing a large speed increase in same direction at the rear wheel, enhancing speed of the electric vehicle; (4) when the wheel motor C1 is connected to and drives the sun gear shaft A16, the sun gear A13 is then connected to and drives the planet carrier A12, the planet carrier shaft A15 is then connected to and drives the front wheel 101, the sun gear A13 is as an input, the planet carrier A12 is as an output, and the ring gear A11 is held, providing a large speed reduction in same direction at the front wheel set to result in a torque increase at the front wheel. Accordingly, in some embodiments, the examples of configurations can be selected or combined in different ways for the implementation of operation of the electric vehicle.

In some embodiments, (1) the planetary gear assembly A1 is installed in an upright manner, which indicates that the wheel motor C1 is connected to the sun gear shaft A16, the planet carrier shaft A15 is connected to the wheel, providing a large speed reduction in same direction at the wheel to result in a torque increase at the wheel; (2) the planetary gear assembly A1 is installed in an inverted manner, which indicates that the wheel motor C1 is connected to the planet carrier shaft A15, the sun gear shaft A16 is connected to the wheel, providing a large speed increase in same direction at the wheel to enhance speed of the electric vehicle.

When the wheel motor C1 is connected to but does not drive the planetary gear assembly A1, the wheel which idles reversely drives the planetary gear assembly A1, and the planetary gear assembly A1 reversely drives the wheel motor C1 to reversely generate electric power, so as to charge the main battery 200. The planetary gear assembly A1 can then operate in one of the following configurations: (1) when the front wheel 101 idles and the front wheel 101 is connected to and drives the sun gear shaft A16, the sun gear A13 is then connected to and drives the planet carrier A12, the planet carrier shaft A15 is then connected to and drives the wheel motor C1 to generate electric power, the ring gear A11 is held, the sun gear A13 is as an input, and the planet carrier A12 is as an output, making the planetary gear assembly A1 achieve a large speed reduction in same direction to charge the main battery 200; (2) when the rear wheel 102 idles and the rear wheel 102 is connected to and drives the planet carrier shaft A15, the planet carrier A12 is then connected to and drives the sun gear A13, the sun gear shaft A16 is then connected to and drives the wheel motor C1 to generate electric power, the ring gear A11 is held, the planet carrier A12 is as an input, and the sun gear A13 is as an output, making the planetary gear assembly A1 achieve a large speed increase in same direction to charge the main battery 200. In addition, one of the following configurations can be selected: (3) when the front wheel 101 idles and the front wheel 101 is connected to and drives the planet carrier shaft A15, the planet carrier A12 is then connected to and drives the sun gear A13, the sun gear shaft A16 is then connected to and drives the wheel motor C1 to generate electric power, the ring gear A11 is held, the planet carrier A12 is as an input, and the sun gear A13 is as an output, making the planetary gear assembly A1 achieve a large speed increase in same direction to charge the main battery 200; (4) when the rear wheel 102 idles and the rear wheel 102 is connected to and drives the sun gear shaft A16, the sun gear A13 is then connected to and drives the planet carrier A12, and the planet carrier shaft A15 is then connected to and drives the wheel motor C1 to generate electric power, the ring gear A11 is held, the sun gear A13 is as an input, and the planet carrier A12 is as an output, making the planetary gear assembly A1 achieve a large speed reduction in same direction to charge the main battery 200. Accordingly, in some embodiments, the examples of configurations can be selected or combined in different ways for the implementation of operation of the electric vehicle.

In some embodiments, a plurality of planetary gear assemblies A1 can be employed; one or a plurality of planetary gear assemblies A1 can be configured with at least one wheel (i.e., a wheel set) and a wheel motor C1; a plurality of planetary gears A14 can be also employed; and there is a spacing among adjacent ones of the planetary gears A14.

In addition, an outer shaft of the wheel motor C1, for example, is employed for driving the at least one planetary gear A14 of the planetary gear assembly A1 to do work, or is employed for being driven by planetary gear A14 of the planetary gear assembly A1 for generation of electric power. An inner shaft of the wheel motor C1 is connected to and drives the air compressor D. The air compressor D compresses the air to provide the compressed air as fuel for fuel cell 300. For example, the inner shaft of the wheel motor C1 is linked to a crankshaft so as to drive one or a plurality of pistons of an air cylinder of the air compressor D, so that the compressed air is used as fuel and provided to fuel cell 300. In an embodiment, the range-extending, charging, and driving apparatus can be configured with at least one air reservoir E for storing compressed air; the air reservoir E is fluidly coupled or connected to the air compressor D, the air reservoir E is employed for storing the air compressed by the air compressor D when the air compressor D is employed to compress air. For example, compressed air can be provided by the air reservoir E in which the compressed air is stored from after a piston of the air compressor D is driven. However, the instant disclosure is not limited thereto, and it is understood that any structure or configuration that can drive the air compressor D so as to provide compressed air can be also regarded as embodiments of the invention. In another embodiment, the main battery 200 can be charged by using fuel cell 300 which obtains the compressed air as fuel. Further, the instant disclosure is not limited to the way of connection or combinations of the wheel motor, the planetary gear assembly, and the wheel(s). In addition to the shaft-to-shaft connection among the wheel motor, the planetary gear assembly, and the wheel(s), in some embodiments, any two or all three of: the wheel motor, the corresponding planetary gear assembly, and a wheel of the wheel set are connected with zero distance. In other embodiments, any one or all of the wheel motor and the corresponding planetary gear assembly can be embedded into a wheel of the wheel set directly, or embedded into the wheel of the wheel set via at least one cushion/buffer/bumper. In yet other embodiments, any one or all of the wheel motor and the corresponding planetary gear assembly can be screwed into a wheel of the wheel set directly, or screwed into the wheel of the wheel set via at least one cushion, buffer, bumper, or damper. In still other embodiments, any one or all of the wheel motor and the corresponding planetary gear assembly can be joined to a wheel of the wheel set by latches/buckles/buttons, or joined to the wheel of the wheel set via at least one cushion/buffer/bumper by latches/buckles/buttons.

As illustrated above, the embodiments of the range-extending, charging, and driving apparatus for an electric vehicle can effectively extend the cruising range of an electric vehicle, and charge main battery 200 by using the wheel(s) idling. In addition, some embodiments can further enhance the torque, and speed. Some embodiments can further provides air (where oxygen is included) as fuel for fuel cell 300, which can be utilized for charging main battery 200, thus further extending the operation time of electric power of an electric vehicle. Thus, the range-extending, charging, and driving apparatus can achieve a reduced number of times for charging the electric vehicle. The users of electric vehicles can then save the time for finding charging stations, and obtain better usage experience, thus enhancing user acceptance of the electric vehicles.

Figure 3:
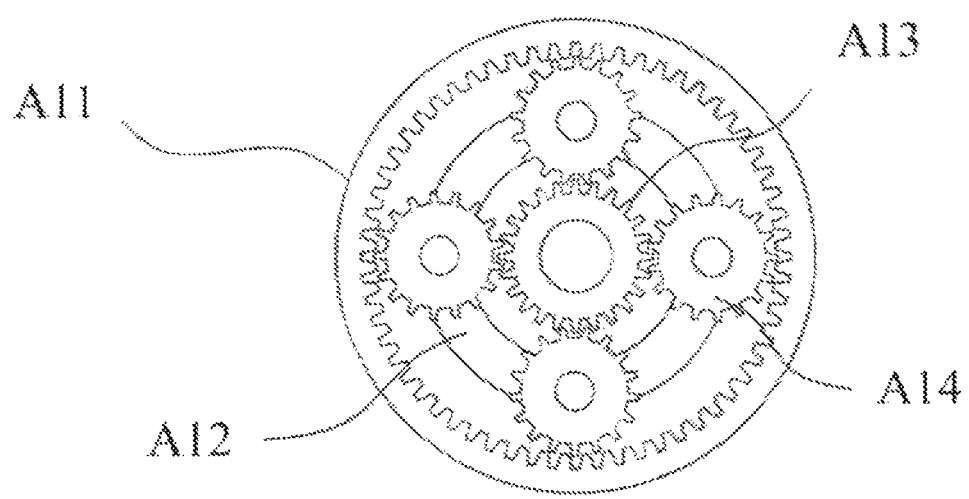
FIGS. 3 to 6 illustrate block diagrams of various embodiments of the range-extending, charging, and driving apparatus for an electric vehicle, according to the first embodiment of the instant disclosure.
Figure 4:
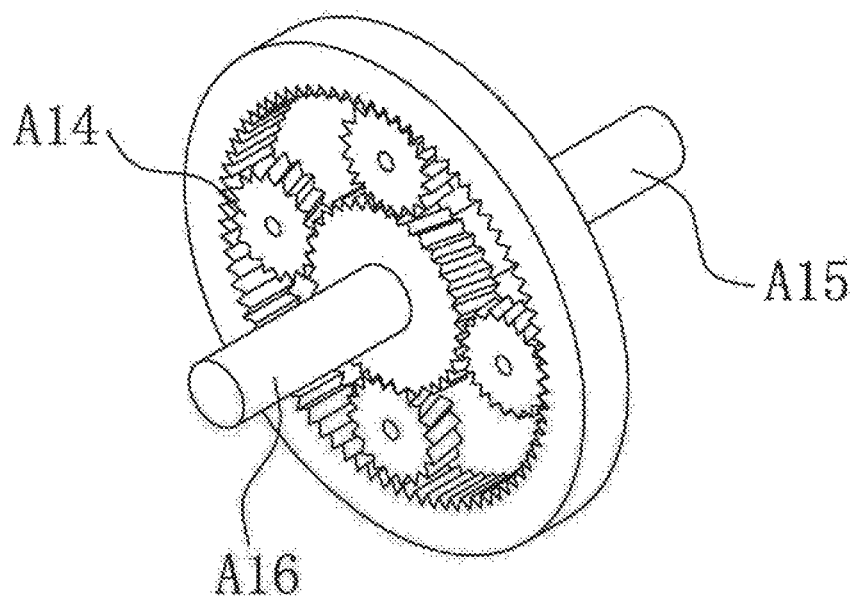
Figure 5:
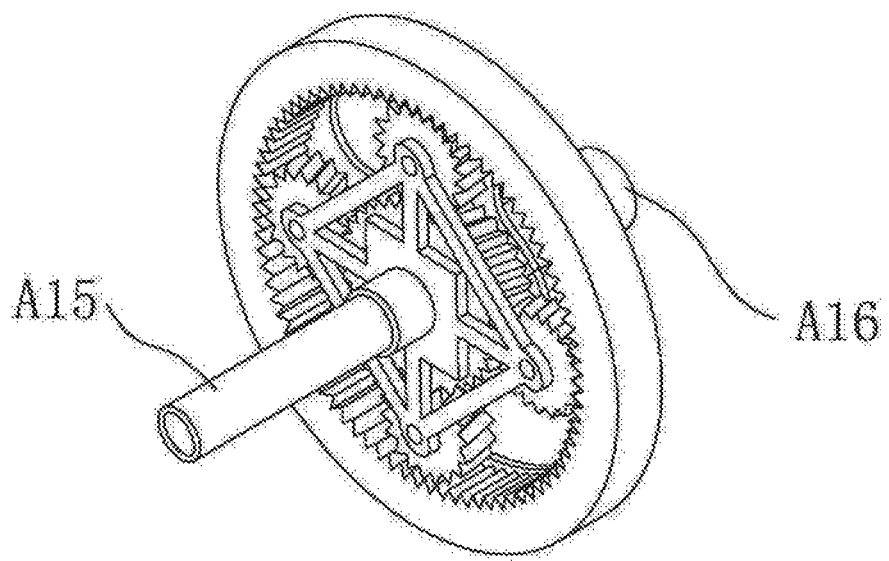
Figure 6:
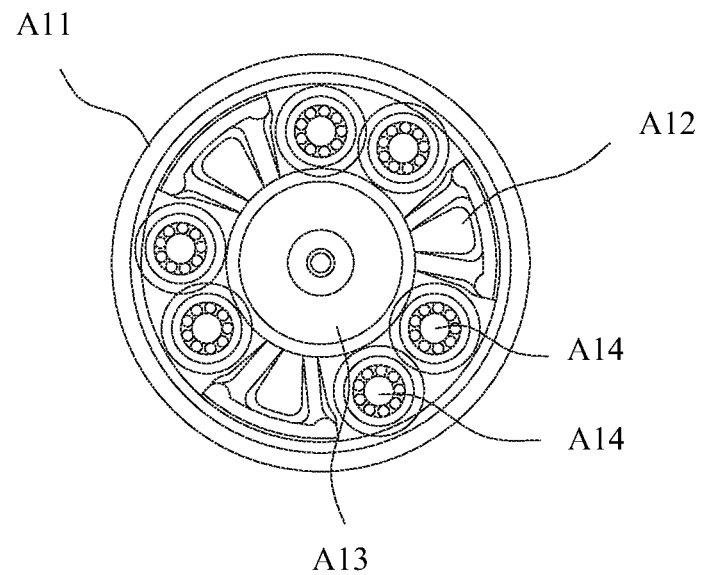

FIGS. 3 to 6 illustrate other embodiments of the range-extending, charging, and driving apparatus. In FIGS. 3 to 5, planetary gear assembly has four planetary gears A14. In FIG. 6, there is a plurality of arrays of planetary gears A14, and a spacing exists among adjacent ones of the planetary gear arrays, and each planetary gear array may have two or more planetary gears A14 engaged with each other.

Figure 7:
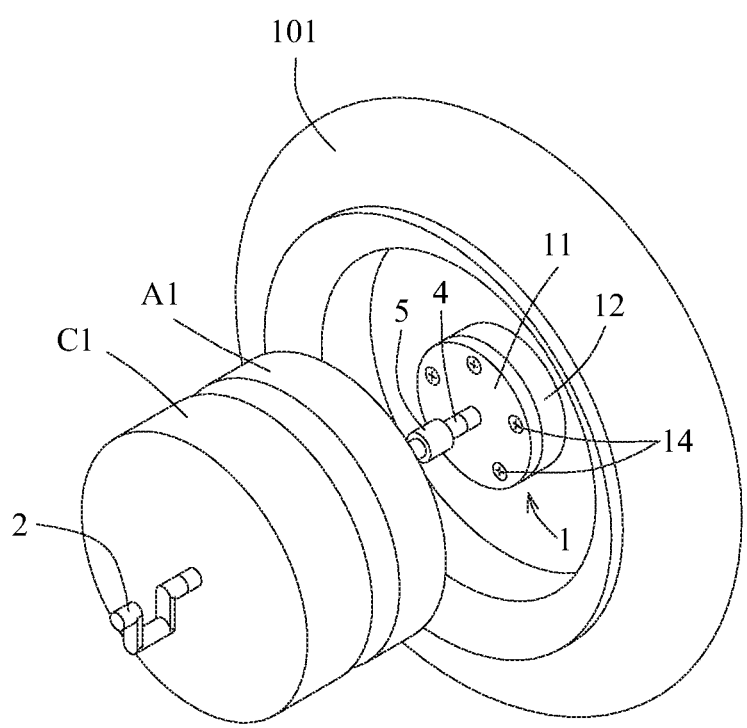
FIG. 7 illustrates a perspective view of a range-extending, charging, and driving apparatus for an electric vehicle, according to a second embodiment of the instant disclosure, wherein the main battery, the air compressor, the air reservoir, and the fuel cell are omitted.
Figure 8:
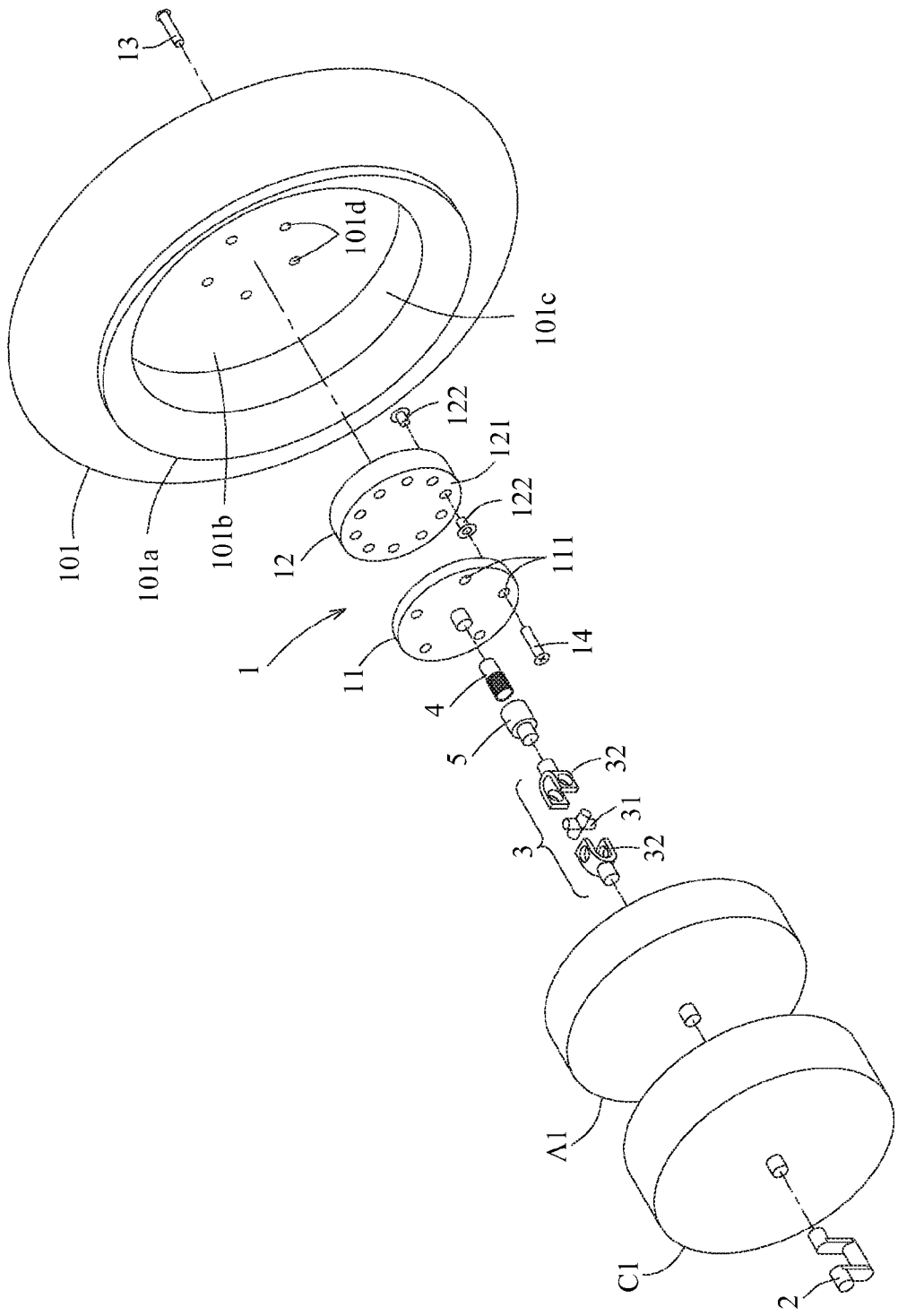
FIG. 8 illustrates a partial exploded view of the range-extending, charging, and driving apparatus for an electric vehicle, according to the second embodiment of the instant disclosure, wherein the main battery, the air compressor, the air reservoir, and the fuel cell are omitted.

Please refer to FIGS. 7 and 8. An embodiment showing the planetary gear assembly A1 is embedded into the wheel set 100 (shown in FIG. 1A) via a damping component is described as following. The range-extending, charging, and driving apparatus of the second embodiment comprises a planetary gear assembly A1, a wheel motor C1, a damping component 1, a crankshaft 2, a universal joint 3, a spline shaft 4, and a shaft liner 5. The crankshaft 2 is connected to the wheel motor C1 for driving an air compressor to operate. The function of the crankshaft 2 is already mentioned in the foregoing paragraphs and omitted here. The wheel motor C1 and the planetary gear assembly A1 may be assembled to the vehicle body or the vehicle frame of an electric vehicle. Here, the vehicle body or the vehicle frame is the chassis of the vehicle. That is, the wheel motor C1 and the planetary gear assembly A1 may be assembled to a position of the chassis in which the position is opposite to a corresponding wheel.

Figure 9:
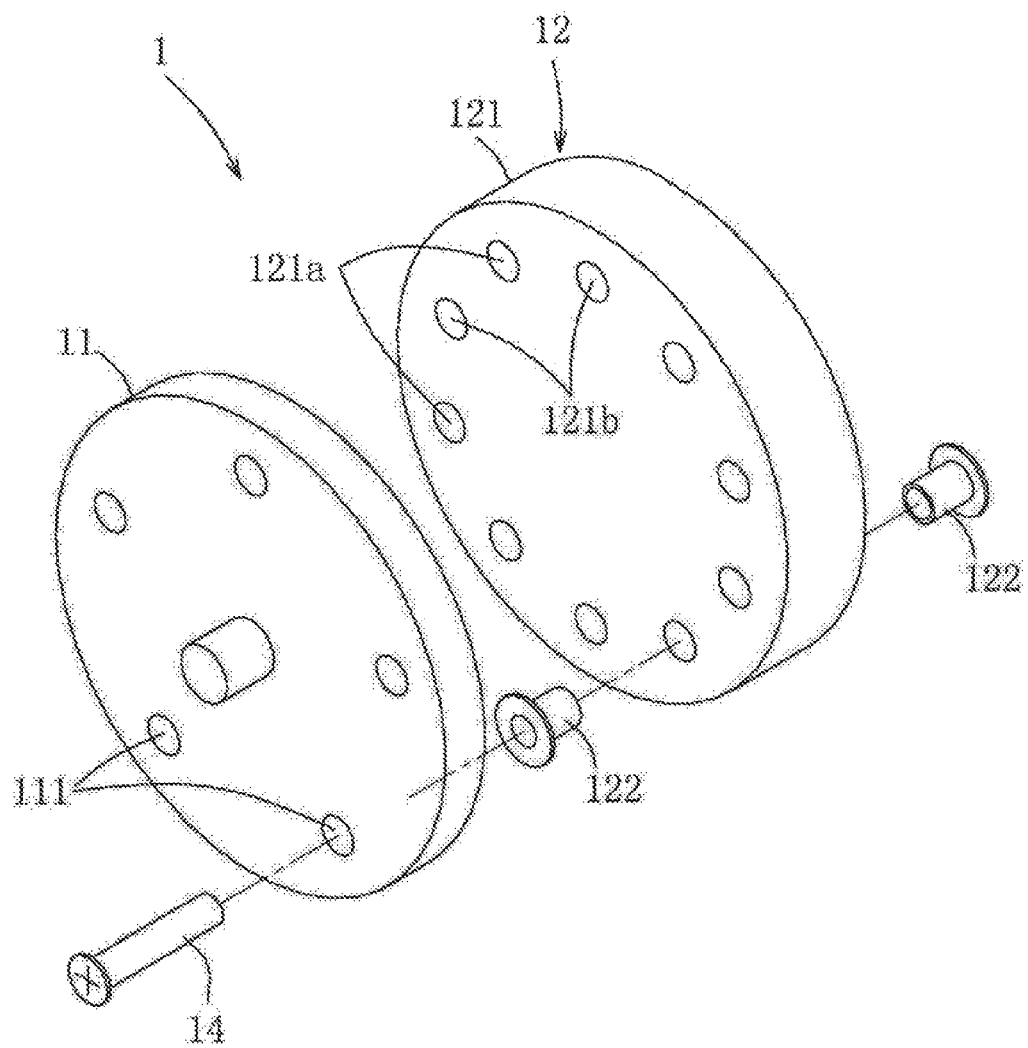
FIG. 9 illustrates an exploded view of a damping component, according to the second embodiment of the instant disclosure.
Figure 10:
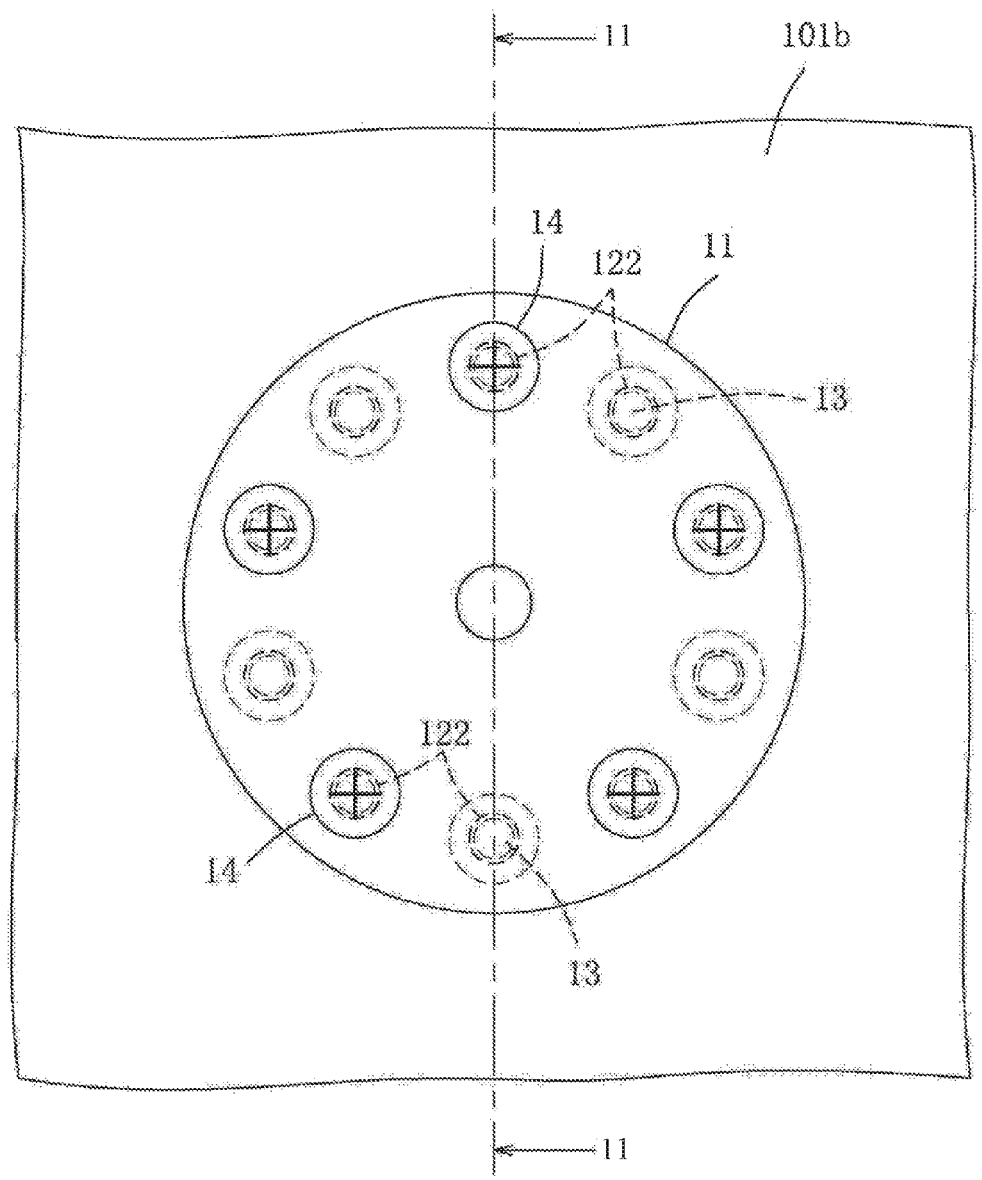
FIG. 10 illustrates a front view showing the damping component assembled with a front wheel, according to the second embodiment of the instant disclosure.
Figure 11:
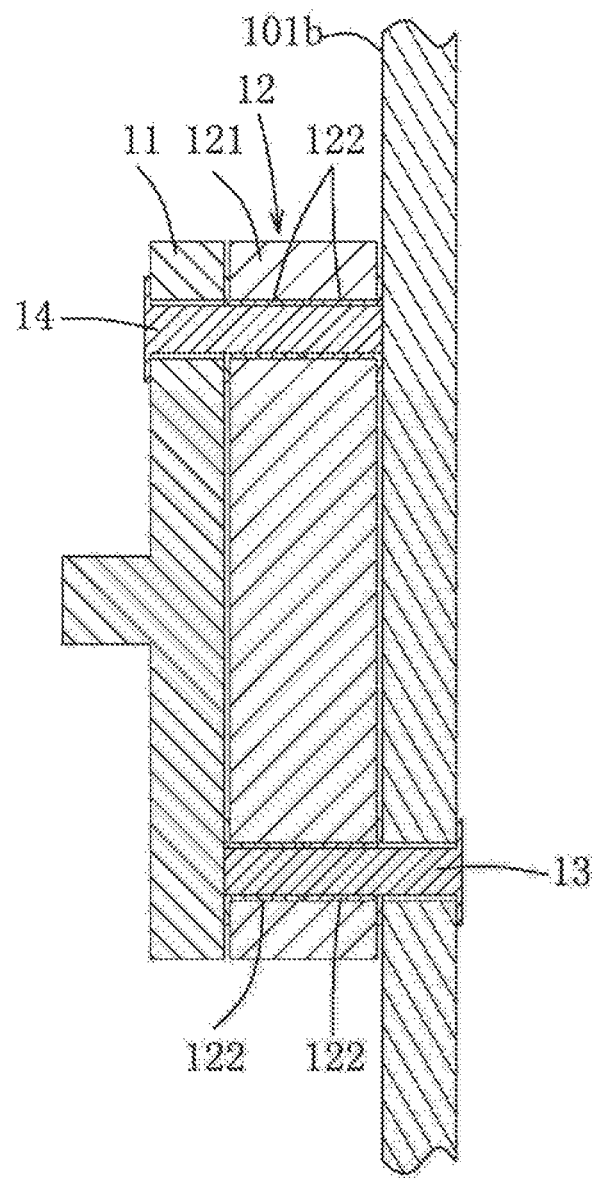
FIG. 11 illustrates a cross-sectional view along the line 11-11 shown in FIG. 10.

Please refer to FIGS. 9 to 11. The damping component 1 comprises a joint plate 11 connected to the planetary gear assembly A, a buffering component 12, and a plurality of bolts (first bolts 13 and second bolts 14). The buffering component 12 is connected to the joint plate 11 and the wheel set. The wheel set may be for example, a front wheel 101 or a rear wheel (as shown in FIG. 1B). In this embodiment, the wheel set is a front wheel 101 for illustration purpose. The front wheel 101 has a rim 101a. The rim 101a has an outer wall 101b and a surrounding wall 101c extended from the outer wall 101b and toward the damping component 1. A plurality of first through holes 101d is defined through the outer wall 101b and arranged annularly and spaced apart. The joint plate 11 is disk shaped. A plurality of second through holes 111 is defined through the joint plate 11 and arranged annularly and spaced apart. In this embodiment, the buffering component 12 is disk shaped. One of two surfaces of the buffering component 12 is connected to the joint plate 11, and the other surface of the buffering component 12 is connected to the rim 101a of the front wheel 101. The first bolts 13 are respectively passing through the first through holes 101d of the front wheel 101 and locked with the buffering component 12. Therefore, the front wheel 101 and the buffering component 12 can be assembled with each other. The second bolts 14 are respectively passing through the second through holes 111 of the joint plate 11 and locked with the buffering component 12. Therefore, the joint plate 11 and the buffering component 12 can be assembled with each other.

In one embodiment, the buffering component 12 may have a damper 121 and a plurality of connection sleeves 122. The damper 121 may be made of elastic material and disk shaped, the connection sleeves 122 are made of metallic material. A plurality of first positioning holes 121a and a plurality of second positioning holes 121b are respectively defined through the damper 121 and arranged annularly and spaced apart. Two ends of the first positioning holes 121a and two ends of the second positioning holes 121b are respectively positioned with the connection sleeves 122. The positions of the first positioning holes 121a and the positions of the second positioning holes 121b are staggered. The first bolts 13 are respectively locked with the connection sleeves 122 at the corresponding first positioning holes 121a, and the second bolts 14 are respectively locked with the connection sleeves 122 at the corresponding second positioning holes 121b. In this embodiment, the number of the first through holes 101d and the number of the second through holes 111 are both five, but embodiments are not limited thereto. The first through holes 101d are equiangularly spaced. The second through holes 111 are also equiangularly spaced. The number of the first positioning holes 121a and the number of the second positioning holes 121b are both five, but embodiments are not limited thereto. The number of the connection sleeves 122 is twenty, but embodiments are not limited thereto. The number of the connection sleeves 122 corresponds to the number of the first positioning holes 121a and the second positioning holes 121b. In addition, in the figure, two connection sleeves 122 as one set are illustrated as example. Further, the joint plate 11, the buffering component 12, and the front wheel 101 are locked and assembled with each other via the first bolts 13 and the second bolts 14. The number of the first bolts 13 and the number of the second bolts 14 respectively correspond to the number of the first through holes 101d and the number of the second through holes 111. The number of the first bolts 13 and the number of the second bolts 14 are five, respectively, and in the figure, two bolts are illustrated as example.

In this embodiment, the damper 121 is made of elastic materials like rubber or silicone and the connection sleeves are made of metallic materials. Therefore, the first bolts 13 and the second bolts 14 can be firmly locked to the connection sleeves 122 and do not damage the damper 121. Further, the joint plate 11 is locked with the connection sleeves 122 via the second bolts 14, and the front wheel 101 is locked with the connection sleeves 122 via the first bolts 13. Therefore, when the front wheel 101 and the joint plate 11 suffer shocks, the vibration force of the front wheel 101 and the joint plate 11 may be transmitted to the damper 121 via the first bolts 13 and the second bolts 14, respectively. Hence, the damper 121 can absorb the vibration force to perform shock absorption.

Figure 12:
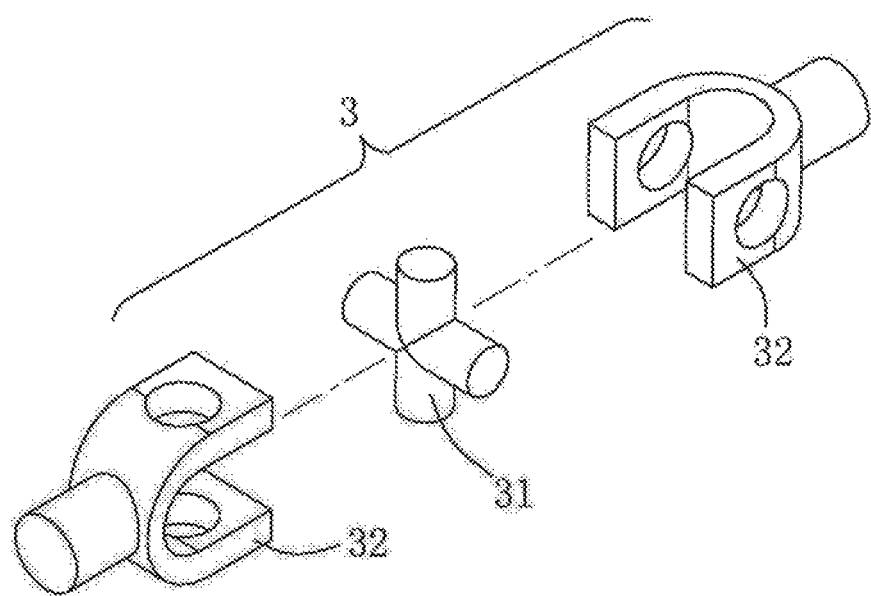
FIG. 12 illustrates an exploded view of a universal joint, according to the second embodiment of the instant disclosure.
Figure 13:
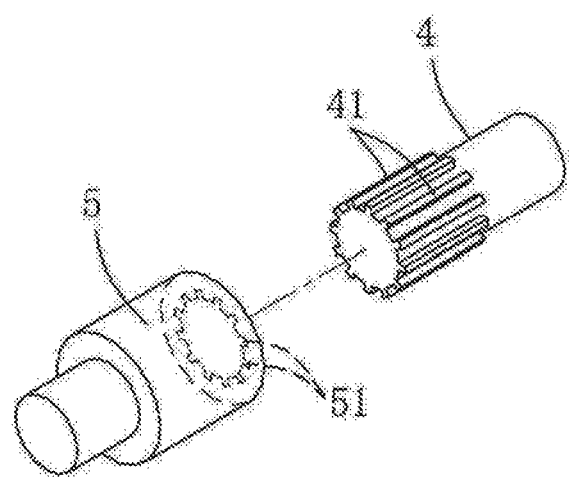
FIG. 13 illustrates an exploded view of a spline shaft and a shaft liner, according to the second embodiment of the instant disclosure.

Please refer to FIGS. 8, 12, and 13. The universal joint 3, the spline shaft 4, and the shaft liner 5 are connected between the planetary gear assembly A1 and the damping component 1. In this embodiment, one of two ends of the universal joint 3 is connected to the planetary gear assembly A1, and the other end of the universal joint 3 is connected to the shaft liner 5. Further, one of two ends of the spline shaft 4 is connected to the shaft liner 5, and the other end of the spline shaft 4 is connected to the damping component 1, but the connection relationship among the universal joint 3, the spline shaft 4, and the shaft liner 5 is not limited thereto. The positions of the universal joint 3 and the assembly of the spline shaft 4 and the shaft liner 5 can be exchanged, or the positions of the spline shaft 4 and the shaft liner 5 can be exchanged, as well. The spline shaft 4 and the shaft liner 5 correspond to each other. The spline shaft 4 can be moved relative to the shaft liner 5 along the axial direction, but the spline shaft 4 cannot rotate relative to the shaft liner 5. In this embodiment, a plurality of ribs 41 is formed on one of two ends of the outer surface of the spline shaft 41, a plurality of grooves 51 is formed on the shaft liner 5, and the grooves 51 respectively correspond to the ribs 41. Accordingly, the spline shaft 4 can be moved relative to the shaft liner 5 along the axial direction, but the spline shaft 4 cannot rotate relative to the shaft liner 5. Hence, the front wheel 101 can move inward or outward laterally during wheel steering to reduce the damage of the components caused by the axial dragging of the external force.

The universal joint 3 comprises a connection member 31 in cross shape and two yoke shafts 32. The two yoke shafts 32 are rotatably pivoted to the transversal axis and the longitudinal axis of the connection member 31. When the front wheel 101 suffers impaction to move up and down or back and forth, the front wheel 101 can perform up-and-down movement or back-and-forth movement relative to the planetary gear assembly A1 via the universal joint 3. Therefore, during the movement of the front wheel 101, the movement of the front wheel 101 does not affect the planetary gear assembly A1 and the wheel motor C1.

Figure 14:
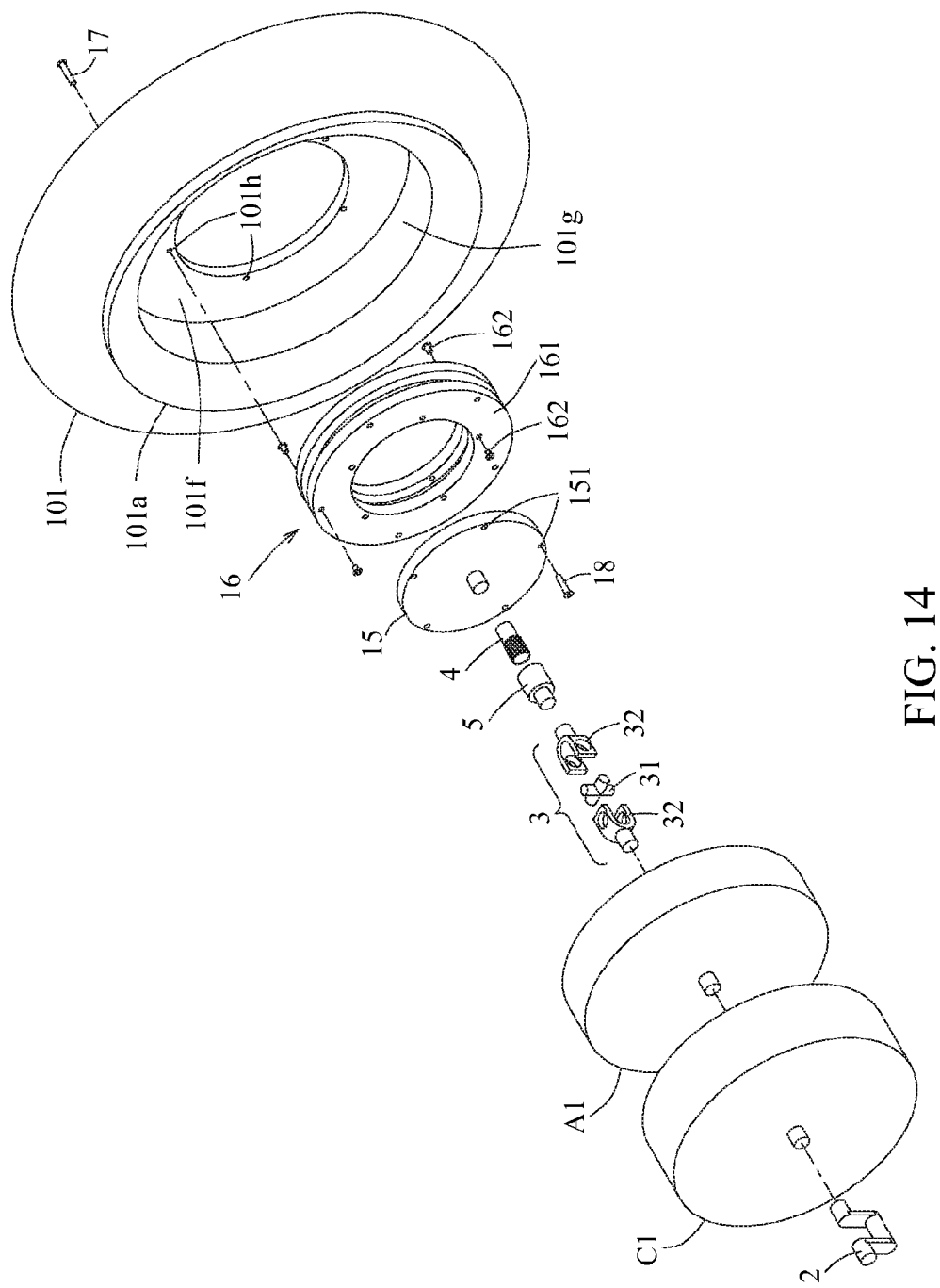
FIG. 14 illustrates a partial exploded view of a range-extending, charging, and driving apparatus for an electric vehicle, according to a third embodiment of the instant disclosure, wherein the main battery, the air compressor, the air reservoir, and the fuel cell are omitted.

Please refer to FIG. 14, a range-extending, charging, and driving apparatus for an electric vehicle according to a third embodiment of the instant disclosure is illustrated. In the third embodiment, the damping component 1 and the front wheel 101 are slightly varied. For the sake of clearance, in the following paragraphs, the damping component 1 and the front wheel 101 are described.

Figure 15:
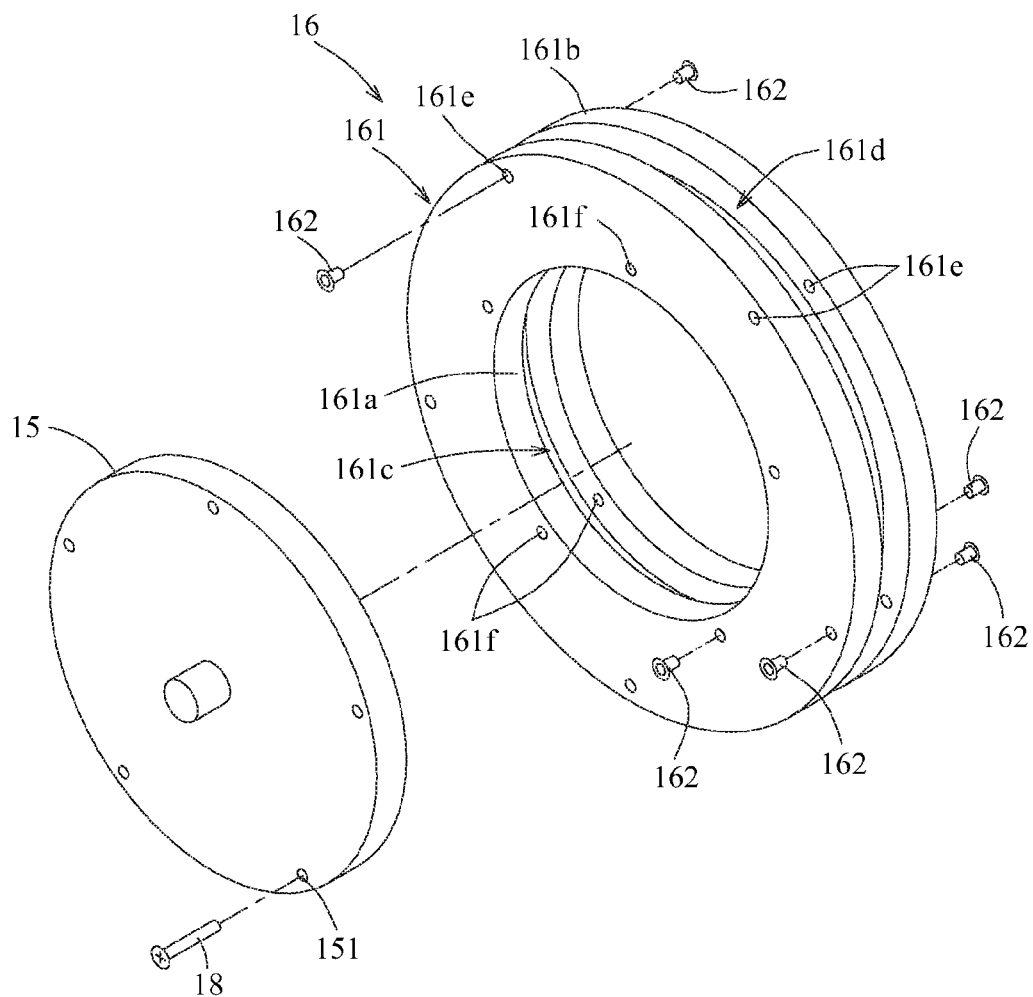
FIG. 15 illustrates an exploded view showing the damping component and a front wheel, according to the third embodiment of the instant disclosure.
Figure 16:
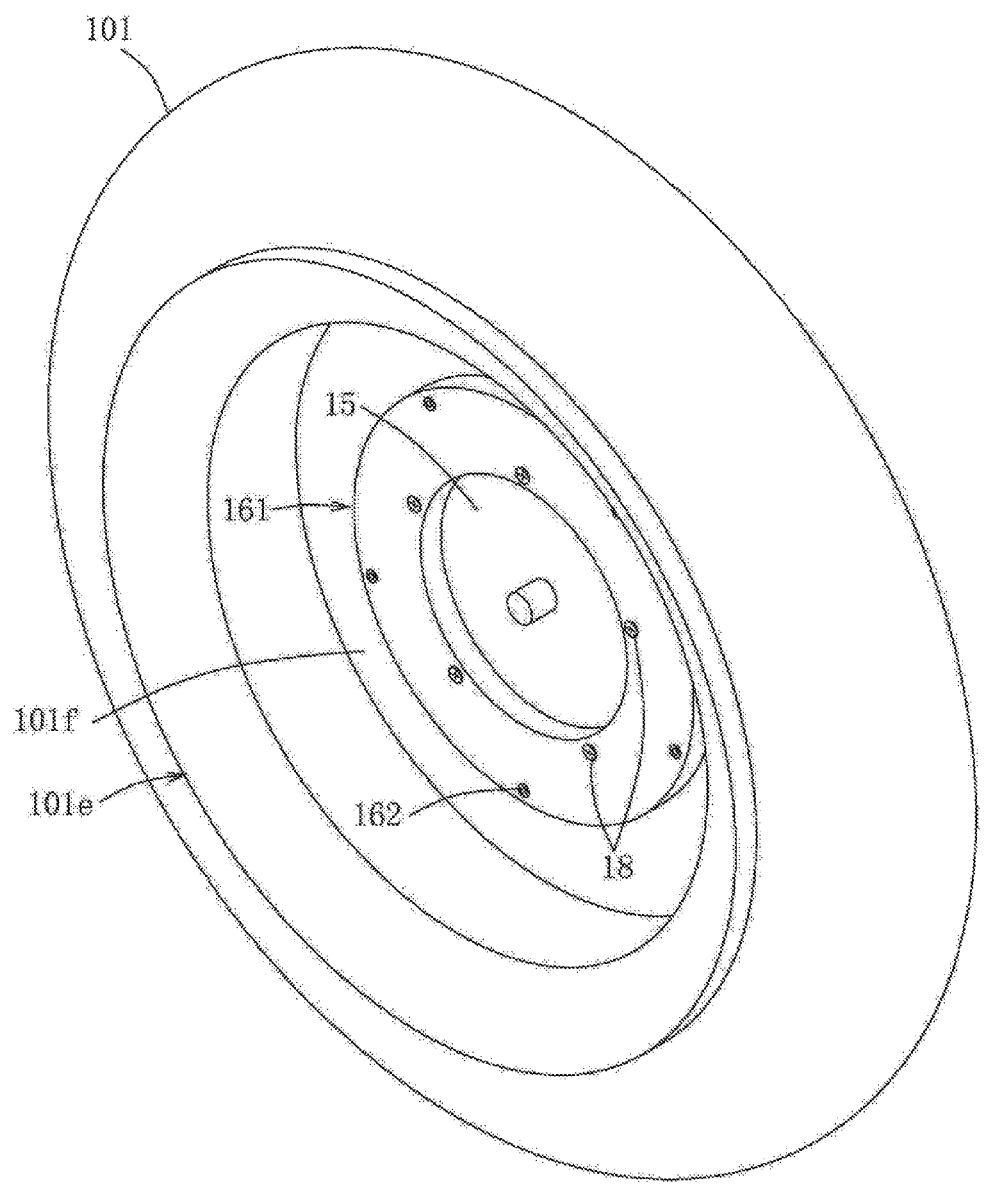
FIG. 16 illustrates a perspective view showing the damping component assembled with the front wheel.
Figure 17:
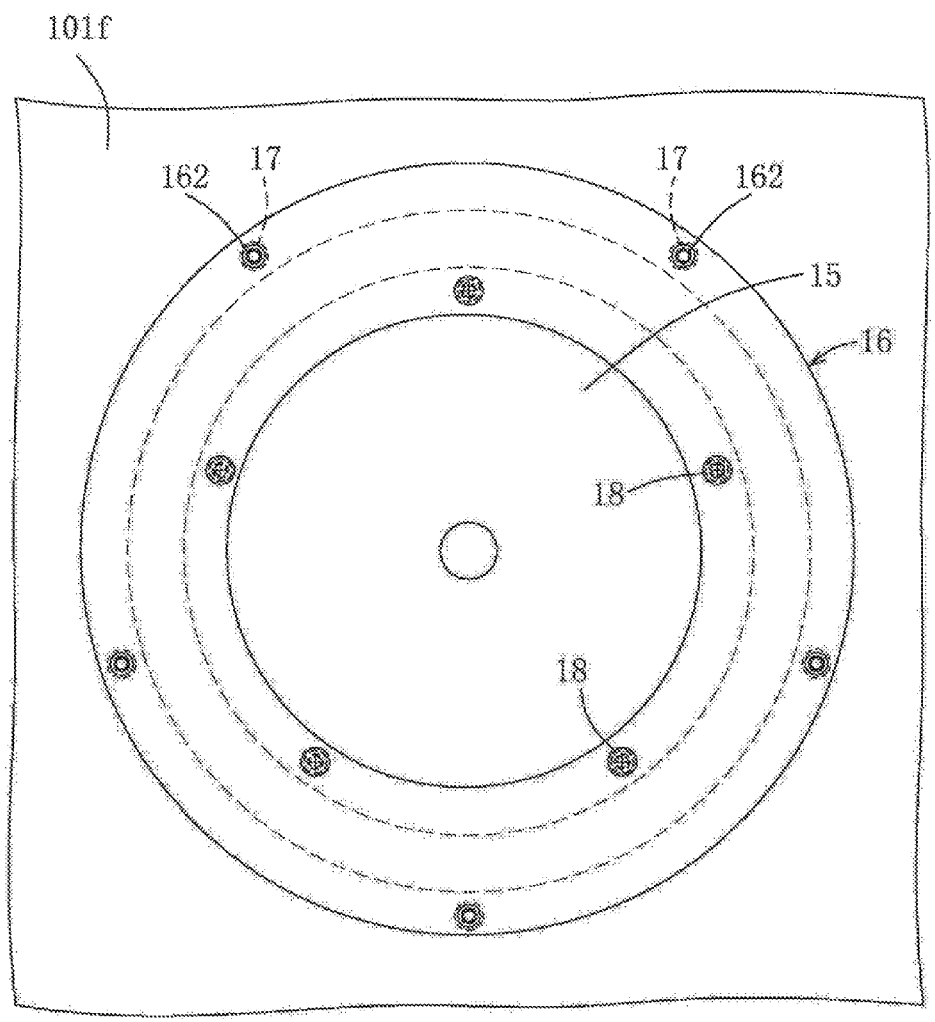
FIG. 17 illustrates a front view showing the damping component assembled with the front wheel.

Please refer to FIGS. 15 to 17. In the third embodiment, the damper 161 of the buffering component 16 is ring shaped. The damper 161 has an inner annular surface 161a and an outer annular surface 161b. The inner annular surface 161a is recessed to form an inner annular groove 161c for engaging with the joint plate 15. The outer annular surface 161b is recessed to from an outer annular groove 161b for engaging with the rim 101e. In this embodiment, the outer wall 101f of the rim 101e further has an opening, and a plurality of first through holes 101h is defined through the outer wall 101f of the rim 101e and arranged annularly and spaced apart. The joint plate 15 is disk shaped, and a plurality of second through holes 151 is defined through the joint plate 15 and arranged annularly and spaced apart. The outer annular groove 161d of the damper 161 is engaged with the periphery of the opening. A plurality of first positioning holes 161e and a plurality of second positioning holes 161f are respectively defined through the damper 161 and arranged annularly and spaced apart. Two ends of the first positioning holes 161e and two ends of the second positioning holes 161f are respectively positioned with connection sleeves 162. The first positioning holes 161e are in communication with the outer annular groove 161d. The second positioning holes 161f are in communication with the inner annular groove 161c. The positions of the first positioning holes 161e and the positions of the second positioning holes 161f are staggered. First bolts 17 are, respectively, locked with the connection sleeves 162 at the corresponding first through holes 101h and the corresponding first positioning holes 161e. Second bolts 18 are, respectively, locked with the connection sleeves 162 at the corresponding second through holes 151 and the corresponding second positioning holes 161f. In this embodiment, any of the first positioning holes 161e and any of the second positioning holes 161f are not aligned along an axial extension line of the damper 161, but embodiments are not limited thereto. Any of the first positioning holes 161e and any of the second positioning holes 161f may be aligned along the axial extension line of the damper 161. Further, in one embodiment, the number of the first through holes 101h equals to the number of the first positioning holes 161e, the first through holes 101h correspond to the first positioning holes 161e, the number of the second through holes 151 equals to the number of the second positioning holes 161f, and the second through holes 151 correspond to the second positioning holes 161f.

Figure 18:
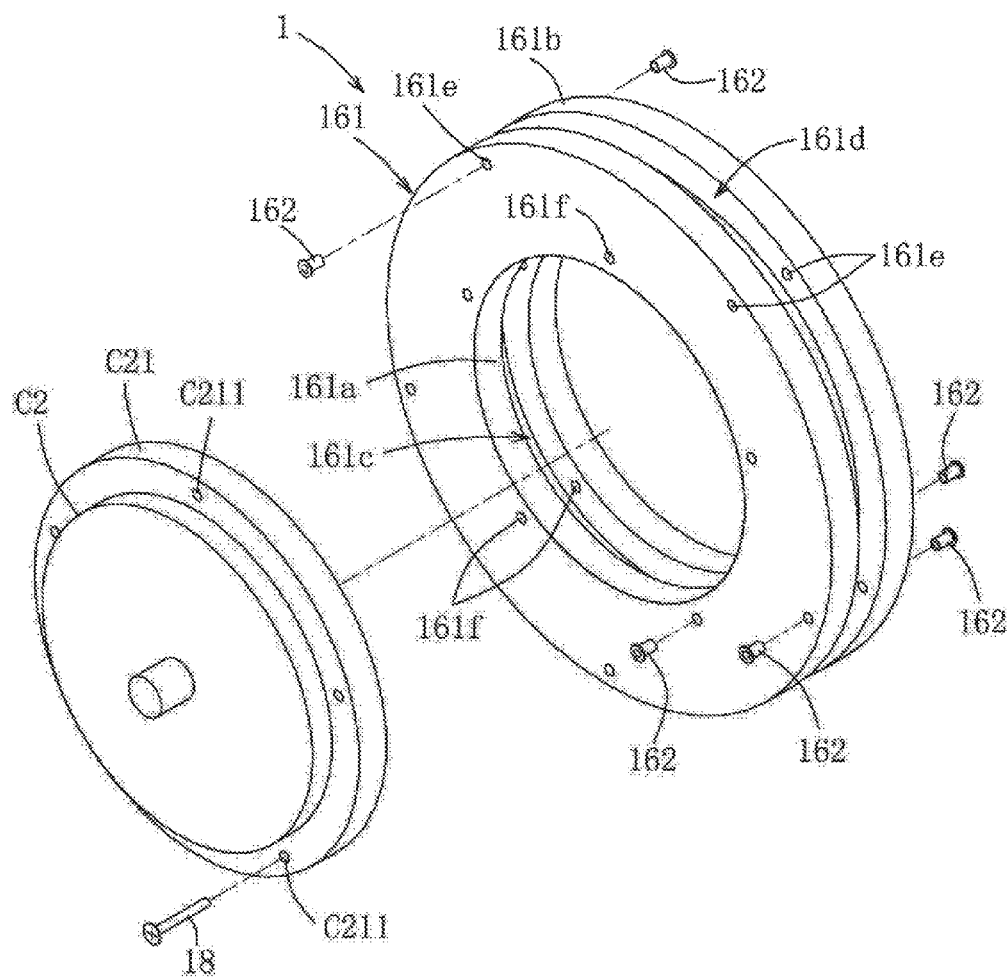
FIG. 18 illustrates a partial exploded view of a range-extending, charging, and driving apparatus for an electric vehicle, according to a fourth embodiment of the instant disclosure, wherein the main battery, the air compressor, the air reservoir, the fuel cell, and the front wheel are omitted.

It is understood that, as shown in FIG. 18, showing a range-extending, charging, and driving apparatus for an electric vehicle according to a fourth embodiment of the instant disclosure. In this embodiment, the apparatus comprises a wheel motor C2 and a damping component 1. The wheel motor C2 has a flange C21, and a plurality of second through holes C211 is formed on the flange C21 and arranged annularly and spaced apart. The damping component 1 does not have the joint plate 15 and the buffering component 16. The damping component 1 comprises a damper 161, first bolts 17 (as shown in FIG. 14), second bolts 18, and connection sleeves 162. The inner annular groove 161c of the damper 161 is for engaging with the flange C21 of the wheel motor C2 and is locked with second through holes C211 and second positioning holes 161f via the second bolts 18. The damper 161 is connected to the front wheel 101 of the wheel set 100 (as shown in FIG. 1A), similar to the third embodiment. By directly assembling the damping component 1 to the wheel motor C2, the problem of vibration and noise of the wheel set 100 and the wheel motor C2 caused by the bumpy road surface can be improved. It is understood that, in this embodiment, the planetary gear assembly, the universal joint, the spline shaft, and the shaft liner are omitted, and in the figure, only the relationship between the wheel motor C2 and the damping component 1 is illustrated.

Figure 19:
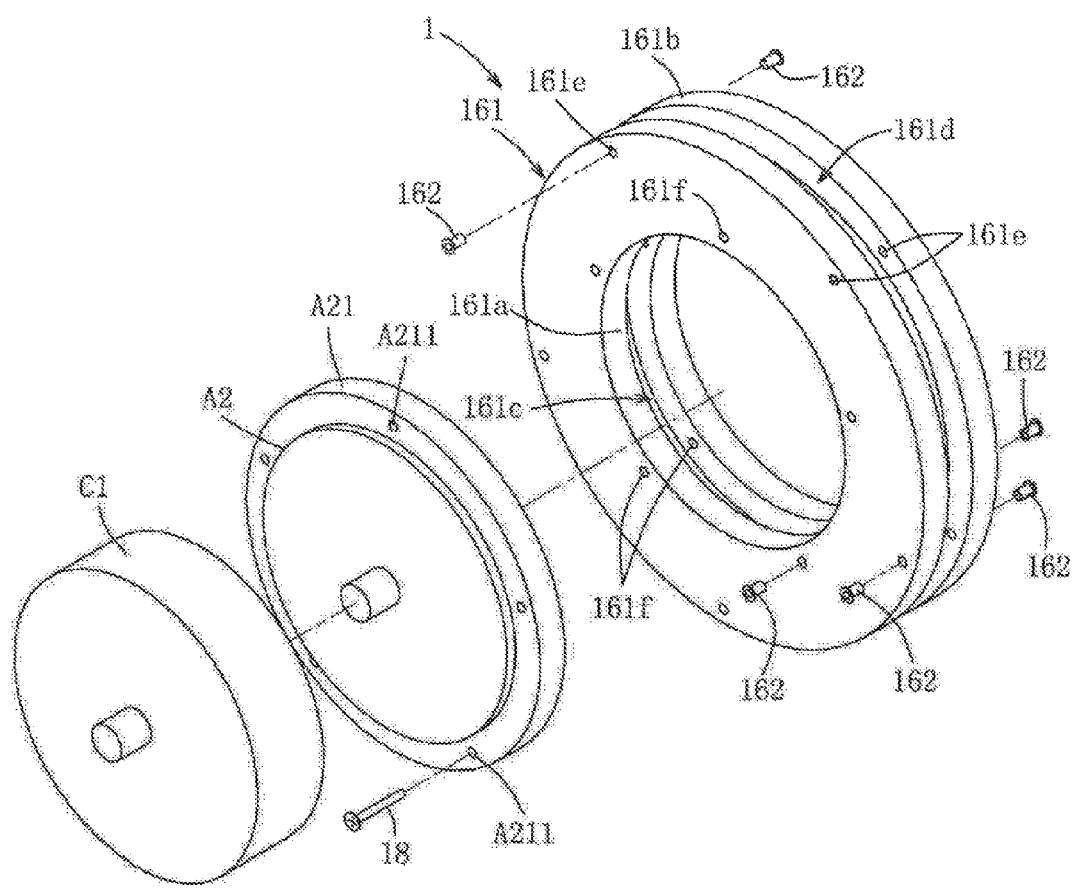
FIG. 19 illustrates a partial exploded view of a range-extending, charging, and driving apparatus for an electric vehicle, according to a fifth embodiment of the instant disclosure, wherein the main battery, the air compressor, the air reservoir, the fuel cell, and the front wheel are omitted.

Please refer to FIG. 19, a range-extending, charging, and driving apparatus for an electric vehicle according to a fifth embodiment of the instant disclosure is illustrated. In this embodiment, the apparatus comprises a wheel motor C1, a planetary gear assembly A2, and a damping component 1. The planetary gear assembly A2 is connected to the wheel motor C1 and has a flange A21, and a plurality of second through holes A211 is formed on the flange A21 and arranged annularly and spaced apart. The damping component 1 does not have the joint plate 15 and the buffering component 16 and comprises a damper 161, first bolts 17 (as shown in FIG. 14), second bolts 18, and connection sleeves 162. The inner annular groove 161c of the damper 161 is for engaging with the flange A21 of the planetary gear assembly A2 and is locked with second through holes A211 and second positioning holes 161f via the second bolts 18. The damper 161 is connected to the front wheel 101 of the wheel set 100 (as shown in FIG. 1A), similar to the third embodiment. By directly assembling the damping component 1 to the planetary gear assembly A2, the problem of vibration and noise of the wheel set 100, the wheel motor C1, and the planetary gear assembly A2 caused by the bumpy road surface can be improved. It is understood that, in this embodiment, the universal joint, the spline shaft, and the shaft liner are omitted, and in the figure, only the relationship between the wheel motor C1, the planetary gear assembly A2, and the damping component 1 is illustrated.

Figure 20:
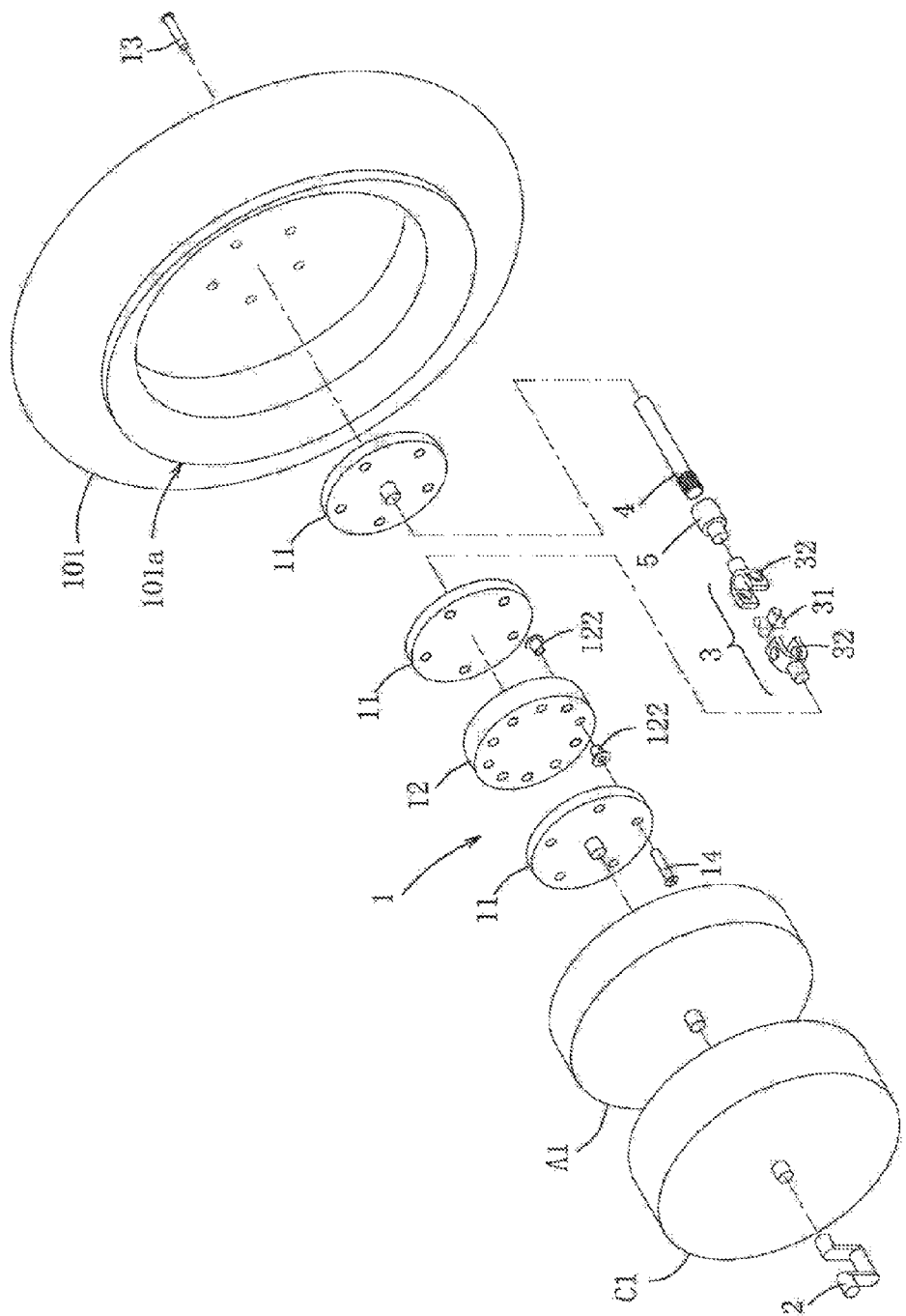
FIG. 20 illustrates a partial exploded view of a range-extending, charging, and driving apparatus for an electric vehicle, according to a sixth embodiment of the instant disclosure, wherein the main battery, the air compressor, the air reservoir, and the fuel cell are omitted.
Figure 21:
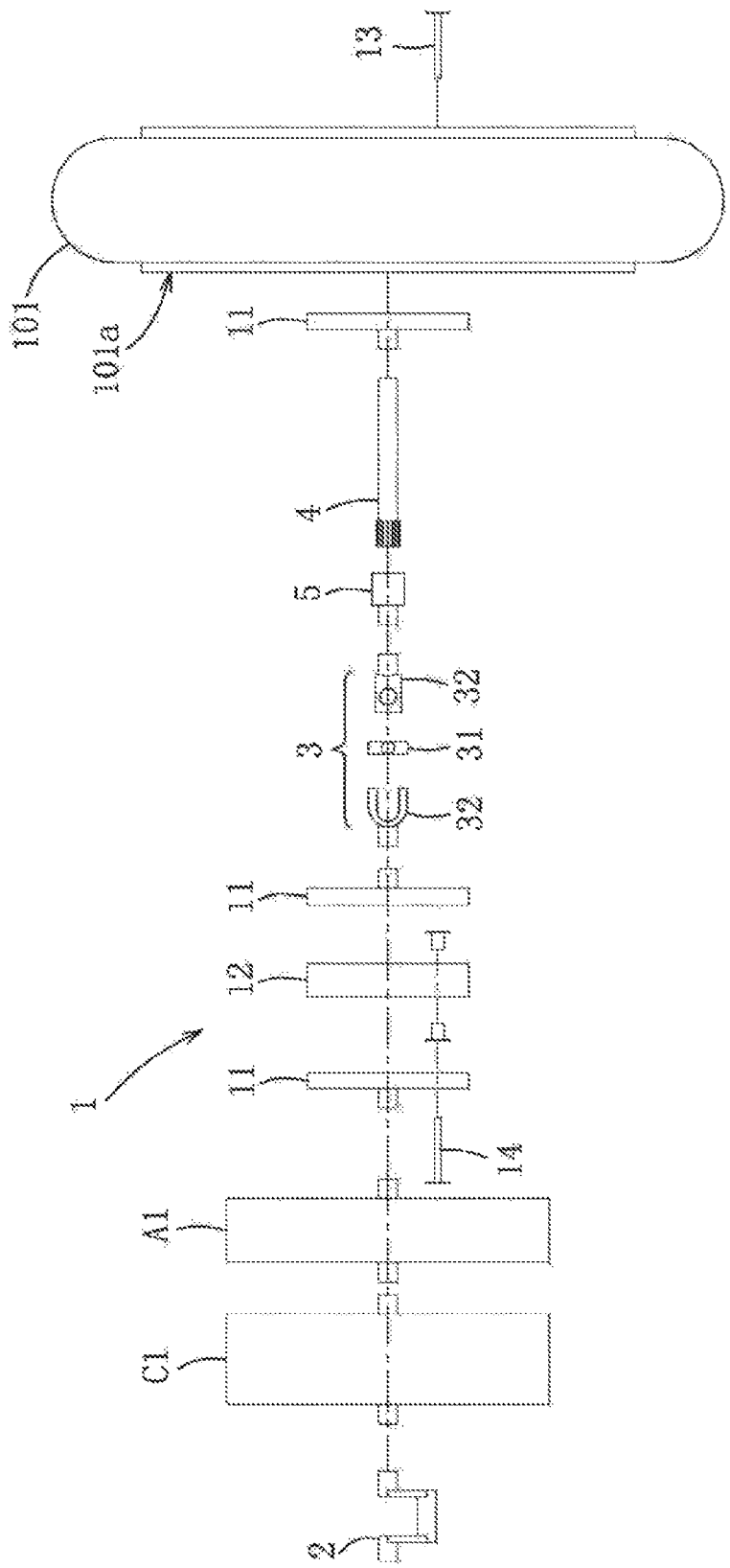
FIG. 21 illustrates a partial lateral exploded view of the range-extending, charging, and driving apparatus for an electric vehicle, according to the sixth embodiment of the instant disclosure.

Please refer to FIGS. 20 and 21, a range-extending, charging, and driving apparatus for an electric vehicle according to a fifth embodiment of the instant disclosure is illustrated. In this embodiment, the relative positions between the damping component 1 and other components are different, as compared with the second embodiment. For example, the wheel motor C1 may be assembled with the damping component 1. Or, the wheel motor C1, the planetary gear assembly A1, and the damping component 1 may be assembled with each other. In a further embodiment, the wheel motor C1 is assembled with the planetary gear assembly A1, and one end of the planetary gear assembly A1 is assembled with the damping component 1 in which the universal joint 3, the shaft liner 5, and the spline shaft 4 are connected in order. One end of the universal joint 3 is connected to one of the joint plates 11 of the damping component 1, one end of the spline shaft 4 is connected to another joint plate 11 of the damping component 1, and the joint plate 11 connected to the spline shaft 4 is connected to the front wheel 101. The wheel motor C1 and the planetary gear assembly A1 may be assembled to the vehicle body or the vehicle frame of an electric vehicle. Here, the vehicle body or the vehicle frame is the chassis of the vehicle. That is, the wheel motor C1 and the planetary gear assembly A1 may be assembled to a position of the chassis in which the position is opposite to a corresponding wheel.

To sum up, various configurations are indicated in the following.

1. When a wheel motor drives a planetary gear assembly, the wheel motor does work on the planetary gear assembly, and the planetary gear assembly then drives the wheel(s) to turn, one of the configurations can be then selected. (1) to obtain a torque increase, a large speed reduction in same direction is achieved at the rear wheel(s) by that the ring gear is held, the sun gear is as an input, and the planet carrier is as an output, during the front wheel(s) idling for generation of electric power; or (2) to enhance speed of the electric vehicle, a large speed increase in same direction is achieved at the front wheel(s) by that the ring gear is held, the sun gear is as an output, and the planet carrier is as an input, during the rear wheel(s) idling for generation of electric power. In addition, one of the following can be selected: (3) to enhance speed of the electric vehicle, a large speed increase in same direction is achieved at the rear wheel(s) by that the ring gear is held, the sun gear is as an output, and the planet carrier is as an input, during the front wheel(s) idling for generation of electric power; or (4) to obtain a torque increase, a large speed reduction in same direction is achieved at the front wheel(s) by that the ring gear is held, the sun gear is as an input, and the planet carrier is as an output, during the rear wheel(s) idling for generation of electric power.

2. When the wheel motor does not drive planetary gear assembly, the idle wheel drives the planetary gear assembly, the planetary gear assembly drives the wheel motor in reverse for generation of electric power, and the planetary gear assembly can then operate in one of the configurations: (1) during the front wheel(s) idling for generation of electric power, a large speed reduction in same direction is achieved at the planetary gear assembly for the front wheel(s) by that the ring gear is held, the sun gear is as an input, and the planet carrier is as an output; or (2) during the rear wheel(s) idling for generation of electric power, a large speed increase in same direction is achieved at the planetary gear assembly for the rear wheel(s) by that the ring gear is held, the sun gear is as an output, and the planet carrier is as an input. In addition, the planetary gear assembly can operate in one of the configurations: (3) during the front wheel(s) idling for generation of electric power, a large speed increase in same direction is achieved at the planetary gear assembly for the front wheel(s) by that the ring gear is held, the sun gear is as an output, and the planet carrier is as an input; or (4) during the rear wheel(s) idling for generation of electric power, a large speed reduction in same direction is achieved at the planetary gear assembly for the rear wheel(s) by that the ring gear is held, the sun gear is as an input, and the planet carrier is as an output.

3. An outer shaft of a wheel motor: when the planetary gear is driven to do work, or when the planetary gear is driven for generation of electric power, an inner shaft of the wheel motor is connected to and drives the air compressor to compress air, so that the compressed air (with oxygen), used as fuel, can be supplied to the fuel cell, which can charge the main battery and/or serve as an electric power source.

4. The impacts of the wheel chattering in, e.g., up-and-down movement or back-and-forth movement on the wheel motor or the impacts on the wheel motor caused by the axial dragging of the external force can be effectively reduced by assembling the damping component, the universal joint, the spline shaft, and the shaft liner between the planetary gear assembly and the wheel.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A range-extending, charging, and driving apparatus for an electric vehicle, the electric vehicle comprising a wheel set, and the apparatus comprising:
  a wheel motor connected to the wheel set of the electric vehicle for driving the wheel set, the wheel motor further connected to a main battery for charging the main battery when the wheel motor generates electric power reversely; and
  a damping component connected between the wheel set and the wheel motor for absorbing shocks of the wheel motor or the wheel set;
  wherein the wheel set has a plurality of first through holes, and the first through holes are arranged annularly and spaced apart, the wheel motor comprises a flange having a plurality of second through holes, and the second through holes are arranged annularly and spaced apart, wherein the damping component comprises:
    a damper having an outer annular surface, an inner annular surface, a plurality of first positioning holes, and a plurality of second positioning holes, wherein the outer annular surface comprises an outer annular groove for engaging with the wheel set, the inner annular surface comprises an inner annular groove for engaging with the flange, the first positioning holes are arranged annularly and spaced apart, the second positioning holes are arranged annularly and spaced apart, the first positioning holes are in communication with the outer annular groove, the second positioning holes are in communication with the inner annular groove;

a plurality of connection sleeves respectively positioned with the first positioning holes and the second positioning holes; and a plurality of bolts respectively passing through the first through holes and the first positioning holes via the corresponding connection sleeves and respectively passing through the second through holes and the second positioning holes via the corresponding connection sleeves, so that the damping component is locked with the wheel set and the wheel motor, respectively.

2. A range-extending, charging, and driving apparatus for an electric vehicle, the electric vehicle comprising a wheel set, and the apparatus comprising:

a wheel motor connected to the wheel set of the electric vehicle for driving the wheel set, the wheel motor further connected to a main battery for charging the main battery when the wheel motor generates electric power reversely; and a damping component connected between the wheel set and the wheel motor for absorbing shocks of the wheel motor or the wheel set;

wherein the wheel set has a plurality of first through holes, and the first through holes are arranged annularly and spaced apart, wherein the apparatus further comprises:

a planetary gear assembly connected between the wheel motor and the damping component, wherein the planetary gear assembly comprises a flange having a plurality of second through holes, and the second through holes are arranged annularly and spaced apart;

wherein when the wheel motor is connected to and drives the planetary gear assembly, the wheel motor does work on the planetary gear assembly, and the planetary gear assembly drives the wheel set to turn;

when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;

wherein the damping component comprises:

a damper having an outer annular surface, an inner annular surface, a plurality of first positioning holes, and a plurality of second positioning holes, wherein the outer annular surface comprises an outer annular groove for engaging with the wheel set, the inner annular surface comprises an inner annular groove for engaging with the flange, the first positioning holes are arranged annularly and spaced apart, the second positioning holes are arranged annularly and spaced apart, the first positioning holes are in communication with the outer annular groove, the second positioning holes are in communication with the inner annular groove;

a plurality of connection sleeves respectively positioned with the first positioning holes and the second positioning holes; and a plurality of bolts respectively passing through the first through holes and the first positioning holes via the corresponding connection sleeves and respectively passing through the second through holes and the second positioning holes via the corresponding connection sleeves, so that the damping component is locked with the wheel set and the planetary gear assembly, respectively.

3. A range-extending, charging, and driving apparatus for an electric vehicle, the electric vehicle comprising a wheel set, and the apparatus comprising:

a wheel motor connected to the wheel set of the electric vehicle for driving the wheel set, the wheel motor further connected to a main battery for charging the main battery when the wheel motor generates electric power reversely; and a damping component connected between the wheel set and the wheel motor for absorbing shocks of the wheel motor or the wheel set;

wherein the wheel set has a plurality of first through holes, and the first through holes are arranged annularly and spaced apart, wherein the apparatus further comprises:

a planetary gear assembly connected between the wheel motor and the damping component;

wherein when the wheel motor is connected to and drives the planetary gear assembly, the wheel motor does work on the planetary gear assembly, and the planetary gear assembly drives the wheel set to turn;

when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;

wherein the damping component comprises:

a joint plate connected to the planetary gear assembly and having a plurality of second through holes;

a damper being disk shaped and having a plurality of first positioning holes and a plurality of second positioning holes, the first positioning holes are arranged annularly and spaced apart, the second positioning holes are arranged annularly and spaced apart;

a plurality of connection sleeves respectively positioned with the first positioning holes and the second positioning holes; and a plurality of bolts respectively passing through the first through holes and the first positioning holes via the corresponding connection sleeves and respectively passing through the second through holes and the second positioning holes via the corresponding connection sleeves, so that the damping component is locked with the wheel set and the joint plate, respectively.

4. The apparatus for an electric vehicle according to claim 3, wherein the planetary gear assembly comprises a planetary gear, a planet carrier unit, a ring gear, and a sun gear unit, wherein the planet carrier unit comprises a planet carrier and a planet carrier shaft, the sun gear unit comprises a sun gear and a sun gear shaft; when the wheel motor is connected to and drives the sun gear shaft, the sun gear is then connected to and drives the planet carrier, and the planet carrier shaft is then connected to and drives the wheel set, the sun gear is as an input, the planet carrier is as an output, and the ring gear is held, providing a large speed reduction in same direction at the wheel set to result in a torque increase at the wheel set.

5. The apparatus for an electric vehicle according to claim 3, wherein the planetary gear assembly comprises a planetary gear, a planet carrier unit, a ring gear, and a sun gear unit, wherein the planet carrier unit comprises a planet carrier and a planet carrier shaft, the sun gear unit comprises a sun gear and a sun gear shaft; when the wheel motor is connected to and drives the planet carrier shaft, the planet carrier is then connected to and drives the sun gear, the sun gear shaft is then connected to and drives the wheel set, the planet carrier is as an input, the sun gear is as an output, and the ring gear is held, providing a large speed increase in same direction at the wheel set to enhance speed of the electric vehicle.

6. The apparatus for an electric vehicle according to claim 3, wherein the damping component further comprises:
- a universal joint connected to the planetary gear assembly;
- a spline shaft connected to the joint plate, wherein the spline shaft comprises a plurality of ribs, the ribs are on one end of the spline shaft; and
- a shaft liner connected between the universal joint and the spline shaft, wherein the shaft liner comprises a plurality of grooves, the grooves are on the shaft liner for receiving the ribs of the spline shaft.

7. The apparatus for an electric vehicle according to claim 4, wherein when the wheel motor is connected to but does not drive the sun gear shaft, the wheel set, which idles, reversely drives the sun gear shaft, and the sun gear shaft then reversely drives the wheel motor to reversely generate electric power so as to charge the main battery.

8. The apparatus for an electric vehicle according to claim 5, wherein when the wheel motor is connected to but does not drive the planet carrier shaft, the wheel set, which idles, reversely drives the planet carrier shaft, and the planet carrier shaft then reversely drives the wheel motor to reversely generate electric power so as to charge the main battery.

9. A range-extending, charging, and driving apparatus for an electric vehicle, the electric vehicle comprising a wheel set, and the apparatus comprising:
- a wheel motor connected to the wheel set of the electric vehicle for driving the wheel set, the wheel motor further connected to a main battery for charging the main battery when the wheel motor generates electric power reversely; and
- a damping component connected between the wheel set and the wheel motor for absorbing shocks of the wheel motor or the wheel set;
- wherein the wheel set has a plurality of first through holes, and the first through holes are arranged annularly and spaced apart, wherein the apparatus further comprises:
  - a planetary gear assembly connected between the wheel motor and the damping component;
  - wherein when the wheel motor is connected to and drives the planetary gear assembly, the wheel motor does work on the planetary gear assembly, and the planetary gear assembly drives the wheel set to turn; when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;
  - wherein the damping component comprises:
    - a joint plate connected to the planetary gear assembly and having a plurality of second through holes;
    - a damper having an outer annular surface, an inner annular surface, a plurality of first positioning holes, and a plurality of second positioning holes, wherein the outer annular surface comprises an outer annular groove for engaging with the wheel set, the inner annular surface comprises an inner annular groove for engaging with the joint plate, the first positioning holes are arranged annularly and spaced apart, the second positioning holes are arranged annularly and spaced apart, the first positioning holes are in communication with the outer annular groove, the second positioning holes are in communication with the inner annular groove;
    - a plurality of connection sleeves respectively positioned with the first positioning holes and the second positioning holes; and
    - a plurality of bolts respectively passing through the first through holes and the first positioning holes via the corresponding connection sleeves and respectively passing through the second through holes and the second positioning holes via the corresponding connection sleeves, so that the damping component is locked with the wheel set and the joint plate, respectively.

10. The apparatus for an electric vehicle according to claim 9, wherein the planetary gear assembly comprises a planetary gear, a planet carrier unit, a ring gear, and a sun gear unit, wherein the planet carrier unit comprises a planet carrier and a planet carrier shaft, the sun gear unit comprises a sun gear and a sun gear shaft; when the wheel motor is connected to and drives the sun gear shaft, the sun gear is then connected to and drives the planet carrier, and the planet carrier shaft is then connected to and drives the wheel set, the sun gear is as an input, the planet carrier is as an output, and the ring gear is held, providing a large speed reduction in same direction at the wheel set to result in a torque increase at the wheel set.

11. The apparatus for an electric vehicle according to claim 9, wherein the planetary gear assembly comprises a planetary gear, a planet carrier unit, a ring gear, and a sun gear unit, wherein the planet carrier unit comprises a planet carrier and a planet carrier shaft, the sun gear unit comprises a sun gear and a sun gear shaft; when the wheel motor is connected to and drives the planet carrier shaft, the planet carrier is then connected to and drives the sun gear, the sun gear shaft is then connected to and drives the wheel set, the planet carrier is as an input, the sun gear is as an output, and the ring gear is held, providing a large speed increase in same direction at the wheel set to enhance speed of the electric vehicle.

12. The apparatus for an electric vehicle according to claim 9, wherein the damping component further comprises:
- a universal joint connected to the planetary gear assembly;
- a spline shaft connected to the joint plate, wherein the spline shaft comprises a plurality of ribs, the ribs are on one end of the spline shaft; and
- a shaft liner connected between the universal joint and the spline shaft, wherein the shaft liner comprises a plurality of grooves, the grooves are on the shaft liner for receiving the ribs of the spline shaft.

13. The apparatus for an electric vehicle according to claim 10, wherein when the wheel motor is connected to but does not drive the sun gear shaft, the wheel set, which idles, reversely drives the sun gear shaft, and the sun gear shaft then reversely drives the wheel motor to reversely generate electric power so as to charge the main battery.

14. The apparatus for an electric vehicle according to claim 11, wherein when the wheel motor is connected to but does not drive the planet carrier shaft, the wheel set, which idles, reversely drives the planet carrier shaft, and the planet carrier shaft then reversely drives the wheel motor to reversely generate electric power so as to charge the main battery.

15. A range-extending, charging, and driving apparatus for an electric vehicle, the electric vehicle comprising a wheel set, and the apparatus comprising:
   a wheel motor connected to the wheel set of the electric vehicle for driving the wheel set, the wheel motor further connected to a main battery for charging the main battery when the wheel motor generates electric power reversely; and
   a damping component connected between the wheel set and the wheel motor for absorbing shocks of the wheel motor or the wheel set;
   wherein the apparatus further comprises:
      a fuel cell, coupled to the main battery and utilized for charging the main battery; and
      a planetary gear assembly connected between the wheel motor and the damping component;
      wherein when the wheel motor is connected to and drives the planetary gear assembly, the wheel motor does work on the planetary gear assembly, and the planetary gear assembly drives the wheel set to turn;
      when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery.

16. The apparatus for an electric vehicle according to claim 15, wherein the wheel set has a plurality of first through holes, and the first through holes are arranged annularly and spaced apart, wherein the apparatus further comprises:
   a planetary gear assembly connected between the wheel motor and the damping component;
   wherein when the wheel motor is connected to and drives the planetary gear assembly, the wheel motor does work on the planetary gear assembly, and the planetary gear assembly drives the wheel set to turn;
   when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;
   wherein the damping component comprises:
   a joint plate connected to the planetary gear assembly and having a plurality of second through holes;
   a damper being disk shaped and having a plurality of first positioning holes and a plurality of second positioning holes, the first positioning holes are arranged annularly and spaced apart, the second positioning holes are arranged annularly and spaced apart;
   a plurality of connection sleeves respectively positioned with the first positioning holes and the second positioning holes; and
   a plurality of bolts respectively passing through the first through holes and the first positioning holes via the corresponding connection sleeves and respectively passing through the second through holes and the second positioning holes via the corresponding connection sleeves, so that the damping component is locked with the wheel set and the joint plate, respectively.

17. The apparatus for an electric vehicle according to claim 16, wherein the damping component further comprises:
   a universal joint connected to the planetary gear assembly;
   a spline shaft connected to the joint plate, wherein the spline shaft comprises a plurality of ribs, the ribs are on one end of the spline shaft; and
   a shaft liner connected between the universal joint and the spline shaft, wherein the shaft liner comprises a plurality of grooves, the grooves are on the shaft liner for receiving the ribs of the spline shaft.

18. The apparatus for an electric vehicle according to claim 15, wherein the wheel set has a plurality of first through holes, and the first through holes are arranged annularly and spaced apart, wherein the apparatus further comprises:
   a planetary gear assembly connected between the wheel motor and the damping component;
   wherein when the wheel motor is connected to and drives the planetary gear assembly, the wheel motor does work on the planetary gear assembly, and the planetary gear assembly drives the wheel set to turn;
   when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;
   wherein the damping component comprises:
      a joint plate connected to the planetary gear assembly and having a plurality of second through holes;
      a damper having an outer annular surface, an inner annular surface, a plurality of first positioning holes, and a plurality of second positioning holes, wherein the outer annular surface comprises an outer annular groove for engaging with the wheel set, the inner annular surface comprises an inner annular groove for engaging with the joint plate, the first positioning holes are arranged annularly and spaced apart, the second positioning holes are arranged annularly and spaced apart, the first positioning holes are in communication with the outer annular groove, the second positioning holes are in communication with the inner annular groove;
      a plurality of connection sleeves respectively positioned with the first positioning holes and the second positioning holes; and
      a plurality of bolts respectively passing through the first through holes and the first positioning holes via the corresponding connection sleeves and respectively passing through the second through holes and the second positioning holes via the corresponding connection sleeves, so that the damping component is locked with the wheel set and the joint plate, respectively.

19. The apparatus for an electric vehicle according to claim 18, wherein the damping component further comprises:
   a universal joint connected to the planetary gear assembly;
   a spline shaft connected to the joint plate, wherein the spline shaft comprises a plurality of ribs, the ribs are on one end of the spline shaft; and a shaft liner connected between the universal joint and the spline shaft, wherein the shaft liner comprises a plurality of grooves, the grooves are on the shaft liner for receiving the ribs of the spline shaft.

20. A range-extending, charging, and driving apparatus for an electric vehicle, the electric vehicle comprising a wheel set, and the apparatus comprising:
   a wheel motor connected to the wheel set of the electric vehicle for driving the wheel set, the wheel motor further connected to a main battery for charging the main battery when the wheel motor generates electric power reversely; and
   a damping component connected between the wheel set and the wheel motor for absorbing shocks of the wheel motor or the wheel set;
   wherein the apparatus further comprises:
      a fuel cell, coupled to the main battery and utilized for charging the main battery;
      an air compressor, connected to the wheel motor, wherein when the wheel motor does work or reversely generates electric power to charge the main battery, the air compressor is driven by the wheel motor to compress air, and the compressed air, utilized as fuel, is provided to the fuel cell capable of being a power source; and
      an air reservoir, fluidly coupled to the air compressor, for storing the air compressed by the air compressor.

21. The apparatus for an electric vehicle according to claim 20, wherein the wheel set has a plurality of first through holes, and the first through holes are arranged annularly and spaced apart, wherein the apparatus further comprises:
   a planetary gear assembly connected between the wheel motor and the damping component;
   wherein when the wheel motor is connected to and drives the planetary gear assembly, the wheel motor does work on the planetary gear assembly, and the planetary gear assembly drives the wheel set to turn;
   when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;
   wherein the damping component comprises:
      a joint plate connected to the planetary gear assembly and having a plurality of second through holes;
      a damper being disk shaped and having a plurality of first positioning holes and a plurality of second positioning holes, the first positioning holes are arranged annularly and spaced apart, the second positioning holes are arranged annularly and spaced apart;
      a plurality of connection sleeves respectively positioned with the first positioning holes and the second positioning holes; and
      a plurality of bolts respectively passing through the first through holes and the first positioning holes via the corresponding connection sleeves and respectively passing through the second through holes and the second positioning holes via the corresponding connection sleeves, so that the damping component is locked with the wheel set and the joint plate, respectively.

22. The apparatus for an electric vehicle according to claim 21, wherein the damping component further comprises:
   a universal joint connected to the planetary gear assembly;
   a spline shaft connected to the joint plate, wherein the spline shaft comprises a plurality of ribs, the ribs are on one end of the spline shaft; and
   a shaft liner connected between the universal joint and the spline shaft, wherein the shaft liner comprises a plurality of grooves, the grooves are on the shaft liner for receiving the ribs of the spline shaft.

23. The apparatus for an electric vehicle according to claim 20, wherein the wheel set has a plurality of first through holes, and the first through holes are arranged annularly and spaced apart, wherein the apparatus further comprises:
   a planetary gear assembly connected between the wheel motor and the damping component;
   wherein when the wheel motor is connected to and drives the planetary gear assembly, the wheel motor does work on the planetary gear assembly, and the planetary gear assembly drives the wheel set to turn;
   when the wheel motor is connected to but does not drive the planetary gear assembly, the wheel set, which idles, reversely drives the planetary gear assembly, and the planetary gear assembly then reversely drives the wheel motor to reversely generate electric power so as to charge the main battery;
   wherein the damping component comprises:
      a joint plate connected to the planetary gear assembly and having a plurality of second through holes;
      a damper having an outer annular surface, an inner annular surface, a plurality of first positioning holes, and a plurality of second positioning holes, wherein the outer annular surface comprises an outer annular groove for engaging with the wheel set, the inner annular surface comprises an inner annular groove for engaging with the joint plate, the first positioning holes are arranged annularly and spaced apart, the second positioning holes are arranged annularly and spaced apart, the first positioning holes are in communication with the outer annular groove, the second positioning holes are in communication with the inner annular groove;
      a plurality of connection sleeves respectively positioned with the first positioning holes and the second positioning holes; and
      a plurality of bolts respectively passing through the first through holes and the first positioning holes via the corresponding connection sleeves and respectively passing through the second through holes and the second positioning holes via the corresponding connection sleeves, so that the damping component is locked with the wheel set and the joint plate, respectively.

24. The apparatus for an electric vehicle according to claim 23, wherein the damping component further comprises:
   a universal joint connected to the planetary gear assembly;
   a spline shaft connected to the joint plate, wherein the spline shaft comprises a plurality of ribs, the ribs are on one end of the spline shaft; and
   a shaft liner connected between the universal joint and the spline shaft, wherein the shaft liner comprises a plurality of grooves, the grooves are on the shaft liner for receiving the ribs of the spline shaft.

* * * * *